US010393275B2

(12) United States Patent
Patil et al.

(10) Patent No.: US 10,393,275 B2
(45) Date of Patent: Aug. 27, 2019

(54) SELF-CLEANING DOUBLE BLOCK AND BLEED VALVE

(71) Applicant: OMNI VALVE COMPANY, LLC, Muskogee, OK (US)

(72) Inventors: Kiran Patil, Maharashtra (IN); Shrikant Waychal, Maharashtra (IN); Vijay Sankpal, Maharashtra (IN)

(73) Assignee: Omni Valve Company, LLC, Muskogee, OK (US)

( * ) Notice: Subject to any disclaimer, the term of this patent is extended or adjusted under 35 U.S.C. 154(b) by 38 days.

(21) Appl. No.: 15/559,760

(22) PCT Filed: Apr. 14, 2015

(86) PCT No.: PCT/US2015/025721
§ 371 (c)(1),
(2) Date: Sep. 19, 2017

(87) PCT Pub. No.: WO2016/167746
PCT Pub. Date: Oct. 20, 2016

(65) Prior Publication Data
US 2018/0045320 A1  Feb. 15, 2018

(51) Int. Cl.
F16K 5/04 (2006.01)
F16K 5/02 (2006.01)
F16K 5/12 (2006.01)
F16K 31/53 (2006.01)
F16K 27/06 (2006.01)
F16K 31/60 (2006.01)

(52) U.S. Cl.
CPC .......... F16K 5/0471 (2013.01); F16K 5/0207 (2013.01); F16K 5/0407 (2013.01); F16K 5/12 (2013.01); F16K 27/065 (2013.01); F16K 31/535 (2013.01); F16K 31/60 (2013.01)

(58) Field of Classification Search
CPC .... F16K 5/0471; F16K 31/535; F16K 27/065; F16K 31/60; F16K 5/12; F16K 5/0407; F16K 5/0207; F16K 5/0605
USPC ................ 251/180–184, 188, 192, 309–312, 251/118–127; 137/15.04–15.06, 601.05, 137/601.16, 625.32
See application file for complete search history.

(56) References Cited

U.S. PATENT DOCUMENTS 286,656 A     10/1883  Van Wie
2,872,155 A    2/1959  Hazard
3,023,783 A *  3/1962  Vickery .............. F16K 31/1635
                                                       137/625.12
3,209,776 A   10/1965  Pearse
(Continued)

FOREIGN PATENT DOCUMENTS

GB        2156492        10/1985

OTHER PUBLICATIONS

Omni Valve Company, LLC, OmniSeal Double Block & Bleed Expanding Plug Valve, 2013, pp. 1-24.

Primary Examiner — Marina A Tietjen
(74) Attorney, Agent, or Firm — McAfee & Taft

(57) ABSTRACT

Disclosed is a self-cleaning double block and bleed valve. The valve includes a plug modified to divert a portion of the fluid flowing through the valve into and through a cavity located beneath the plug. The diverted fluid passing along a secondary flow path beneath the plug and subsequently rejoining the primary flow path. The diverted fluid removes debris, sediment or sludge from the cavity beneath the plug.

26 Claims, 24 Drawing Sheets

(56) References Cited

U.S. PATENT DOCUMENTS

| | | | |
|---|---|---|---|
| 3,605,789 A | | 9/1971 | Graham |
| 3,776,507 A | | 12/1973 | Tomlin et al. |
| 3,948,284 A | * | 4/1976 | Walworth ............... F16K 5/025 |
| | | | 137/238 |
| 4,289,165 A | | 9/1981 | Fredd |
| 4,350,322 A | | 9/1982 | Mueller |
| 5,181,539 A | * | 1/1993 | Yokoyama ............... F16K 5/06 |
| | | | 137/238 |
| 5,287,889 A | * | 2/1994 | Leinen ................. F16K 5/0605 |
| | | | 137/625.3 |
| 5,385,332 A | | 1/1995 | Smith |
| 5,435,521 A | | 7/1995 | Jarecki |
| 5,482,253 A | | 1/1996 | Klyde |
| 6,578,598 B2 | | 6/2003 | Gardner |
| 2008/0105845 A1 | | 5/2008 | Yeary |
| 2010/0327196 A1 | | 12/2010 | Hill et al. |

* cited by examiner

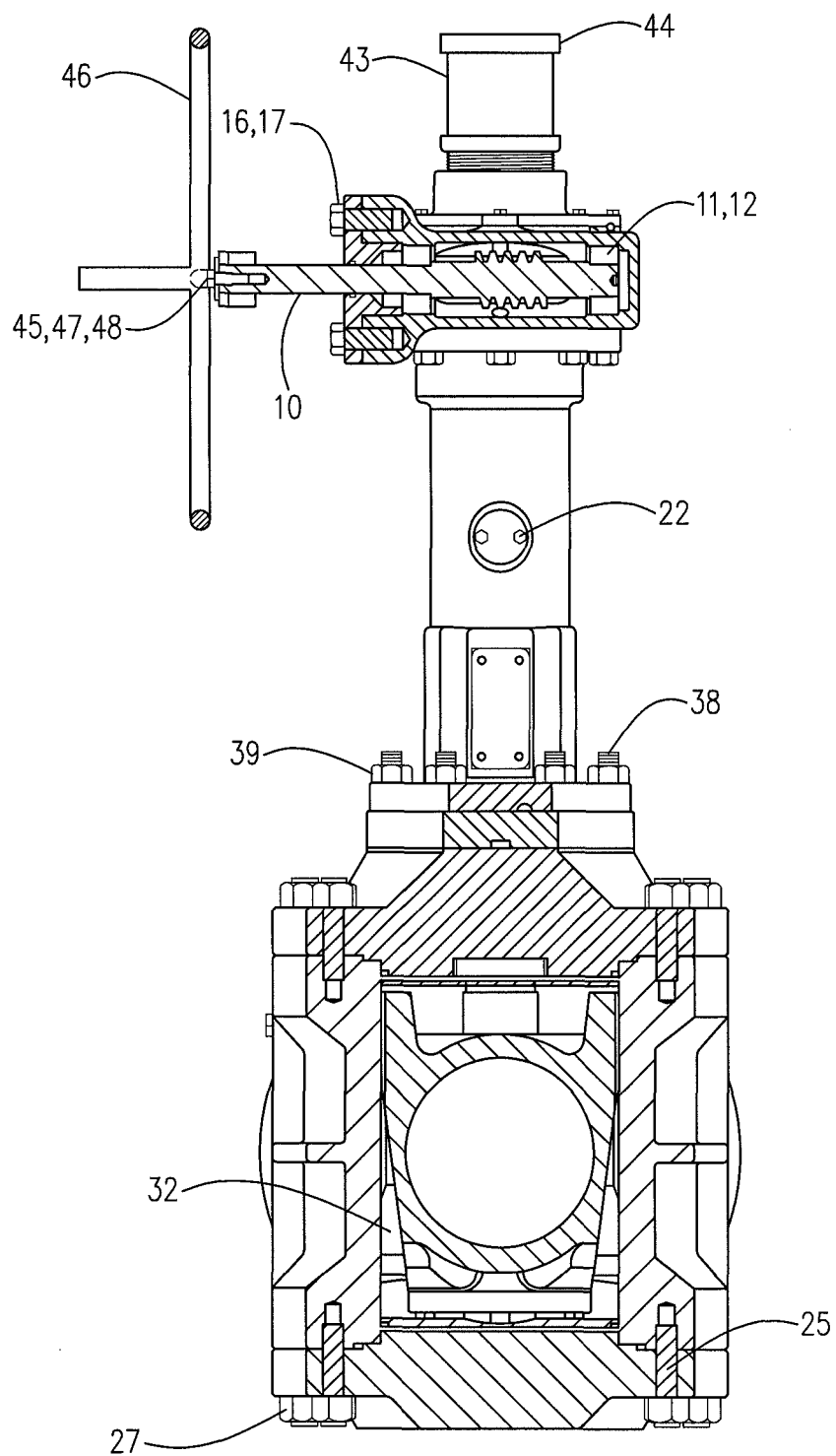
PRIOR ART

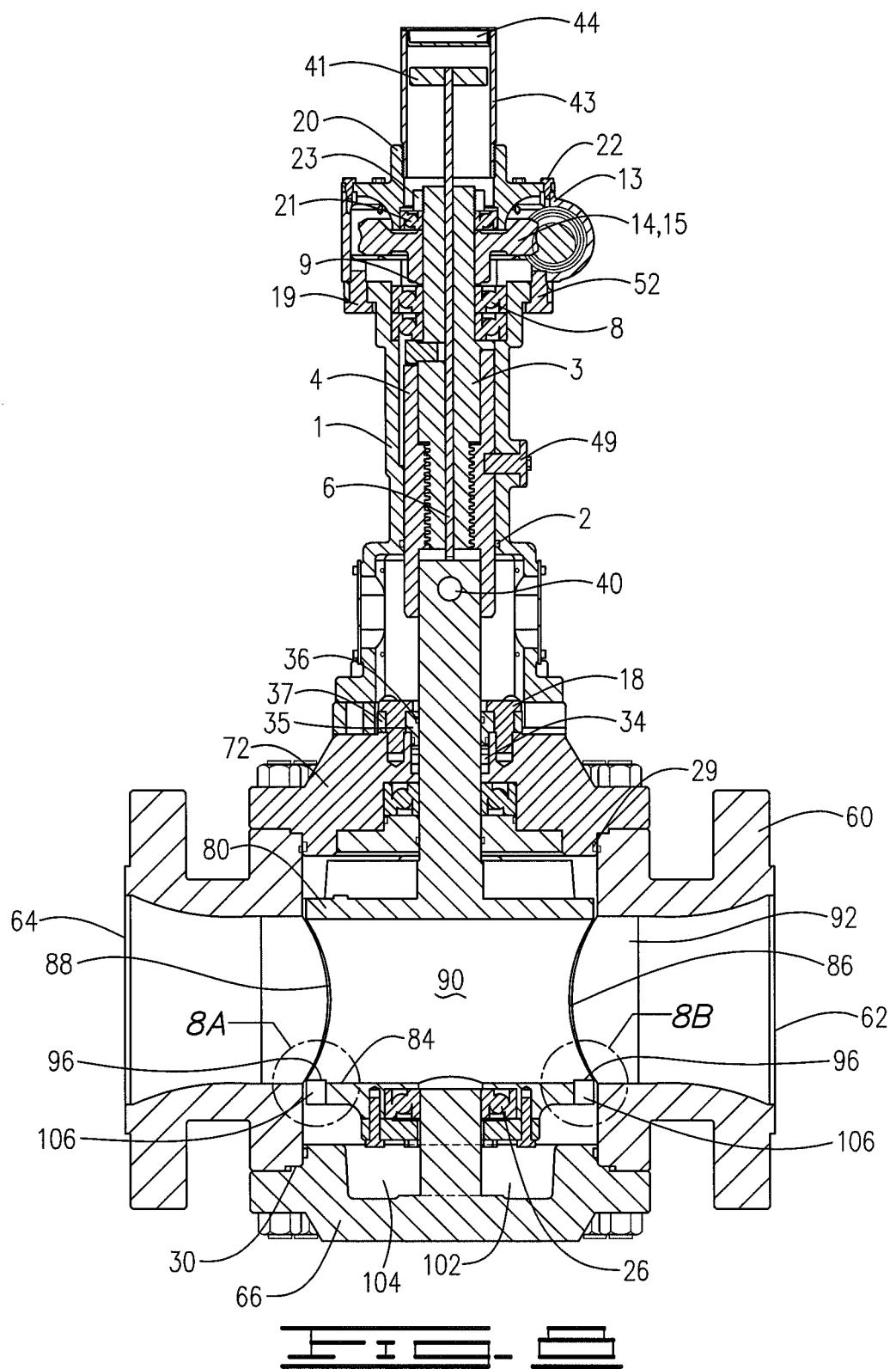

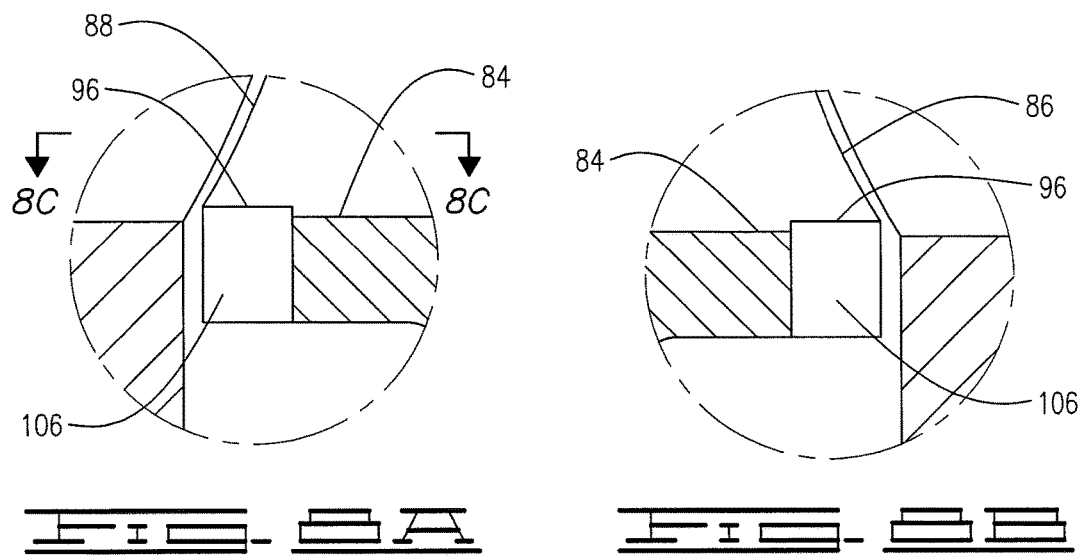
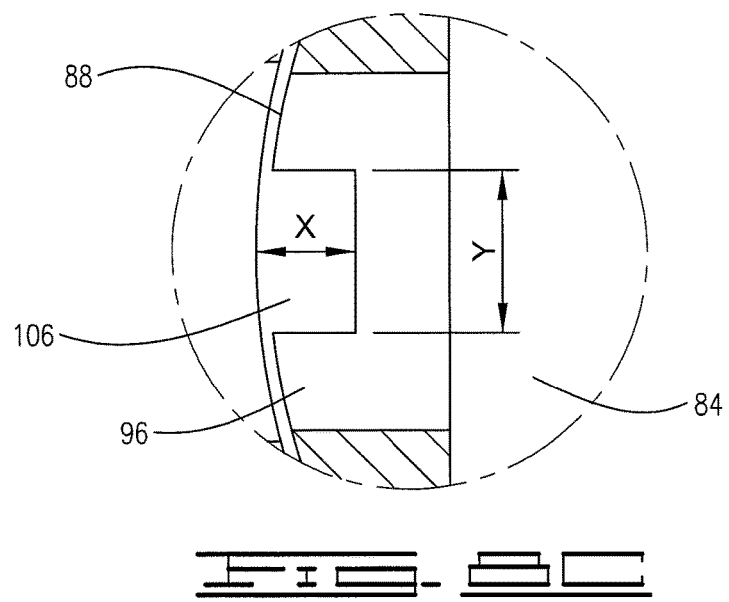

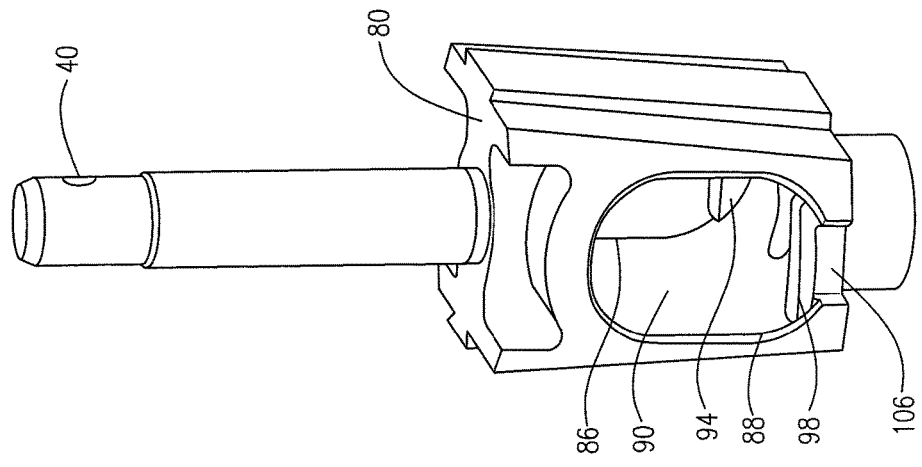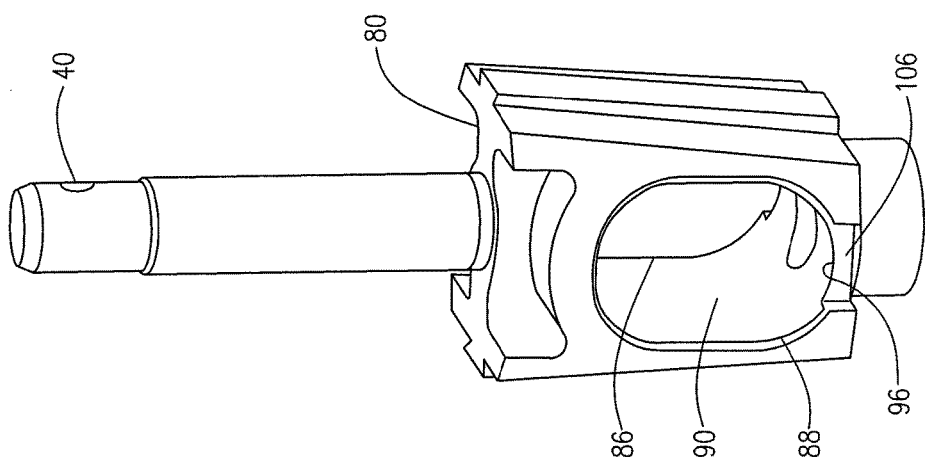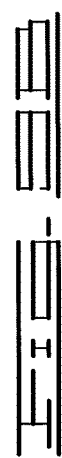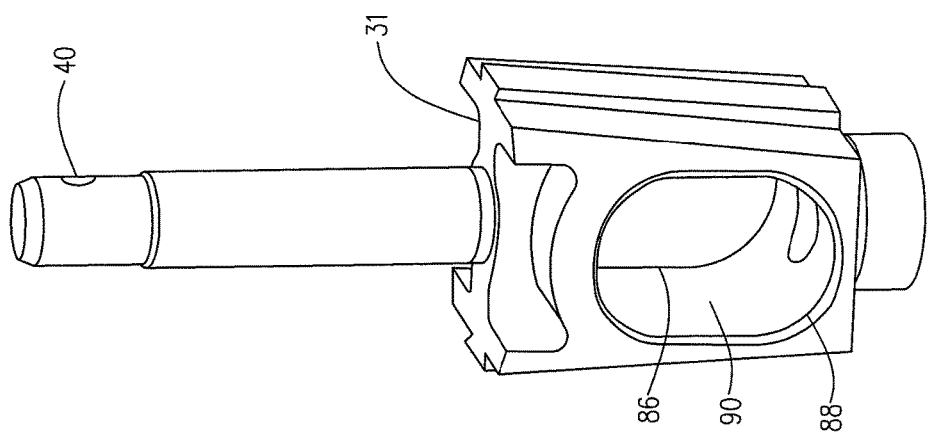
FIG. 9C
FIG. 9B
FIG. 9A
PRIOR ART

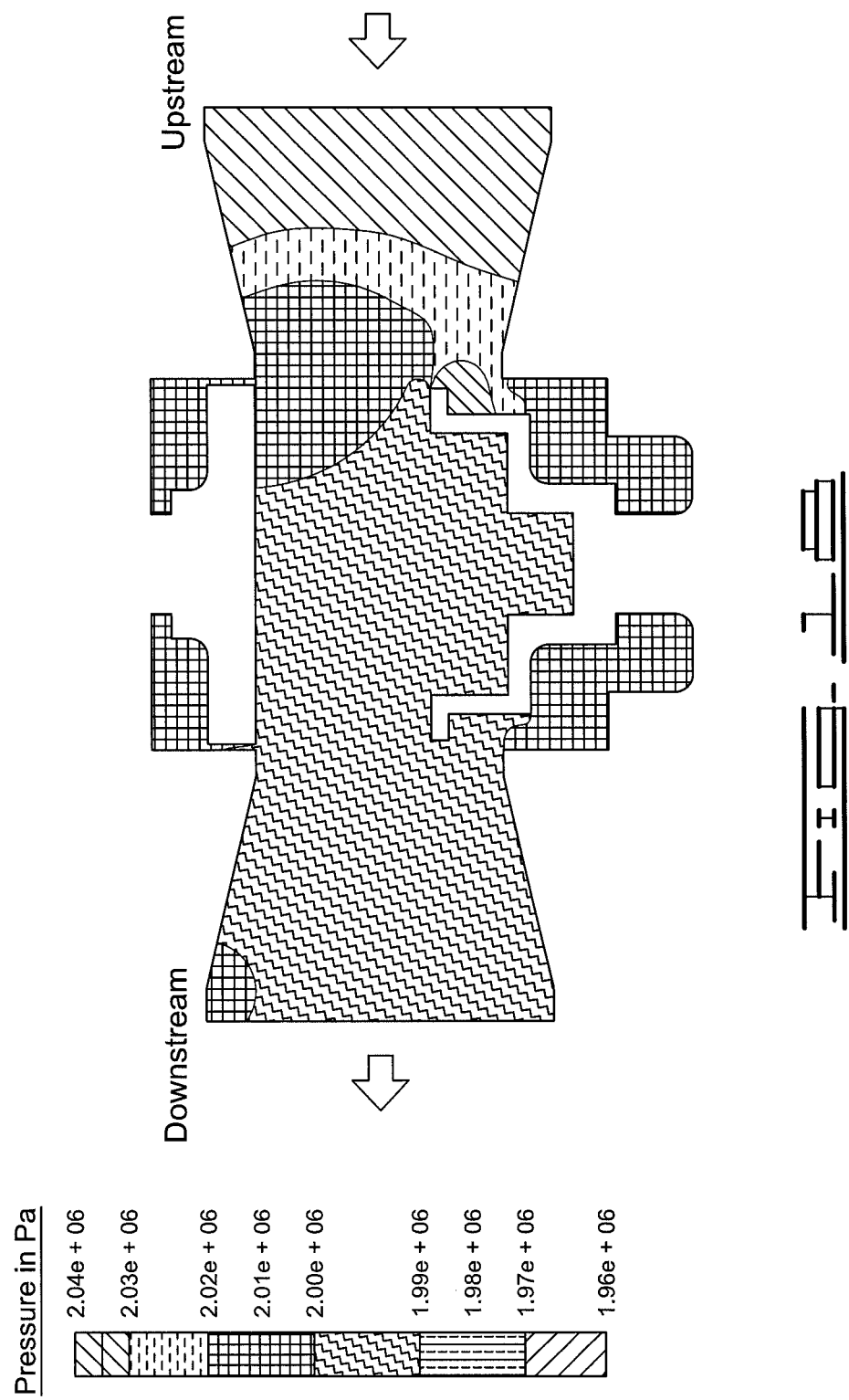

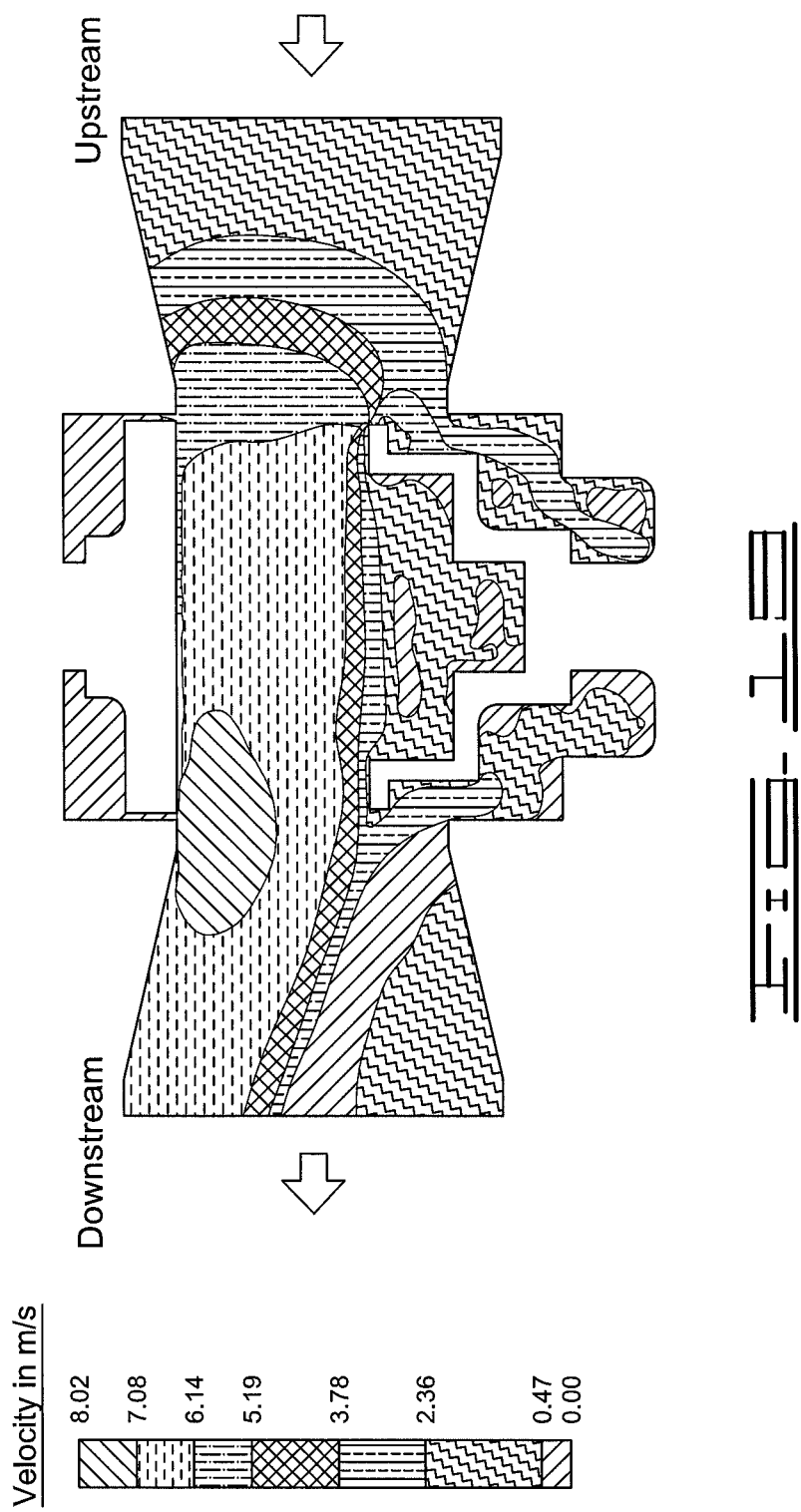

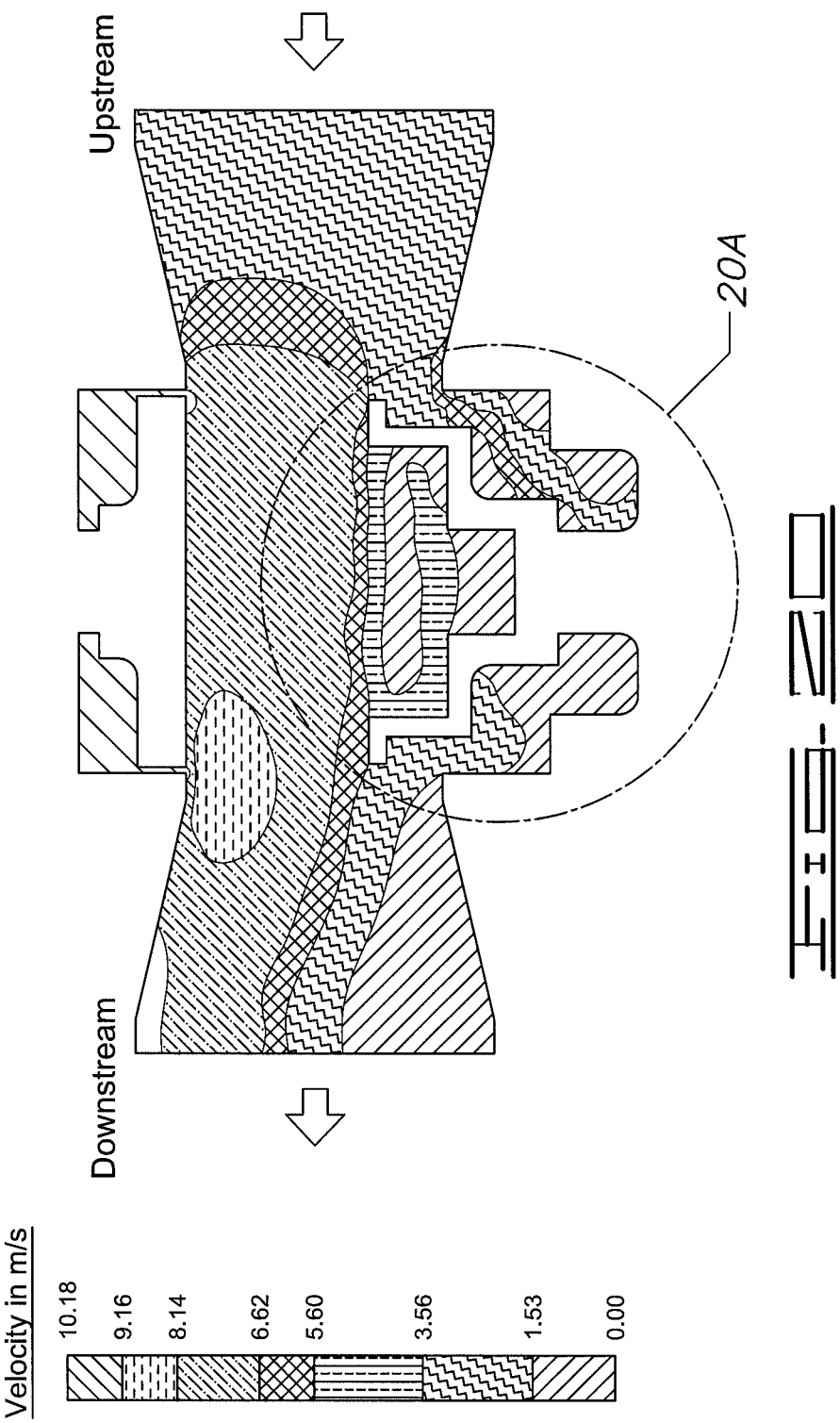

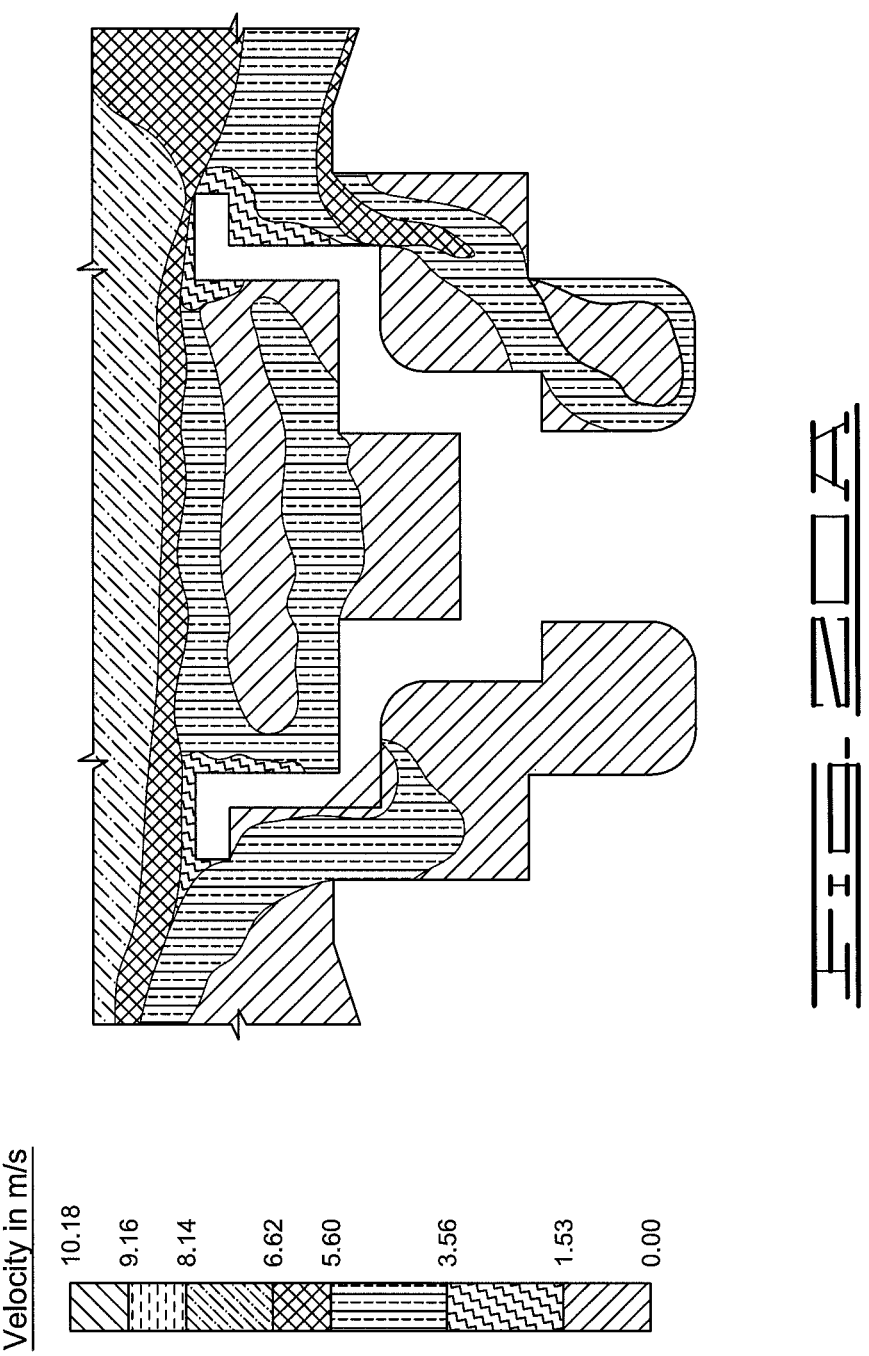

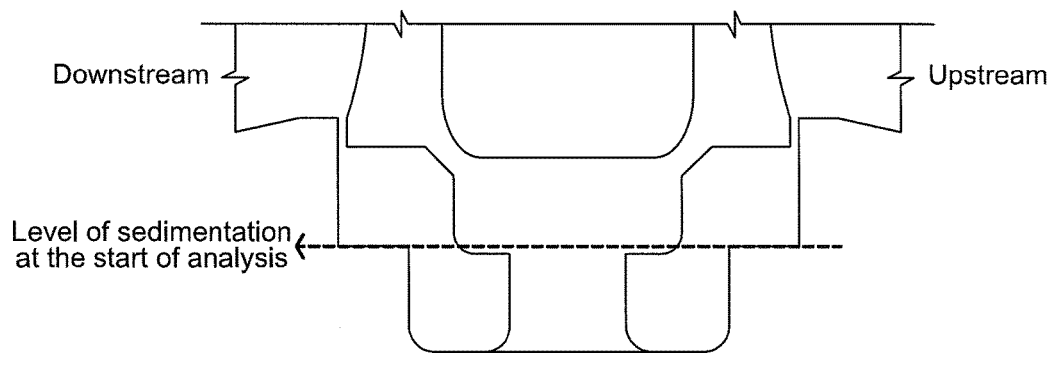
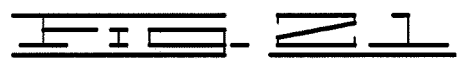
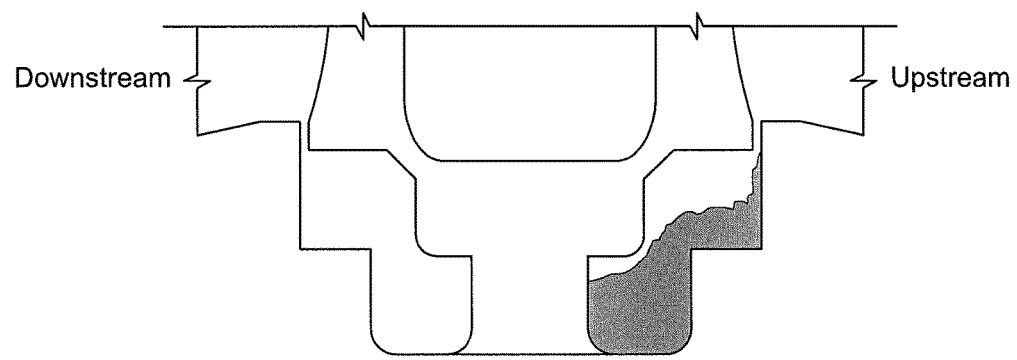

Downstream     Upstream
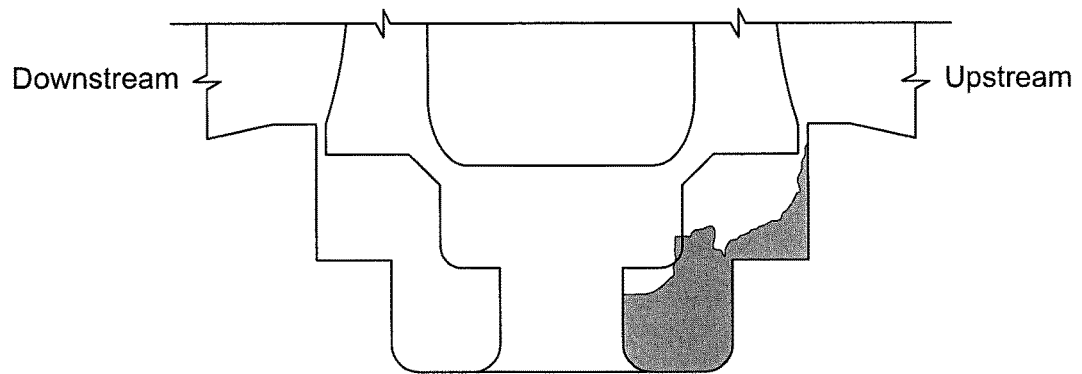
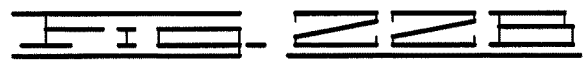
Downstream     Upstream
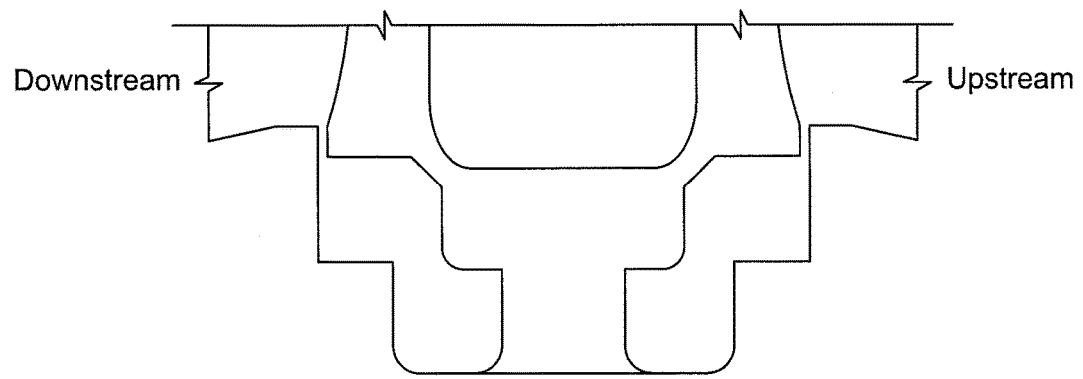
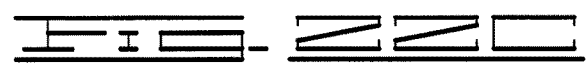

SELF-CLEANING DOUBLE BLOCK AND BLEED VALVE

BACKGROUND

Double block and bleed valves are commonly used in the oil and gas industry. Also known as a DBB plug valves, the DBB valve provides the ability to simultaneously block upstream and downstream flows while also providing the ability to bleed off fluid from the downstream side of the valve. Commonly used in a variety of applications, the DBB valve is an effective mechanism for isolating or blocking fluid flow through a system.

As known to those skilled in the art, a DBB valve includes a valve body and a rotatable plug such as depicted in FIGS. 1-2. Rotation of the plug from a first closed position to a second open position allows for fluid flow through the valve by aligning a central passage in the plug with the inlet and outlet of the valve. As depicted in FIGS. 1-2, when in the open position, the dimensions of the plug closely conform to the interior of the valve thereby providing efficient flow through the plug with little to no fluid loss to the interior of the valve. As known to those skilled in the art, slips (not shown) carrying resilient seals retract away from the valve body as the plug transitions from the closed to the open configuration. With the plug in the open position, rotation of the hand wheel will close the valve by rotating the plug and moving the plug downward resulting in obstruction of the valve body by the plug and outwardly expanding slips carried by the plug. The slips force the resilient seal against the valve body over the inlet and outlet thereby providing a positive closure of the valve to fluid flow. In order to accommodate the downward movement of the plug, the design of the valve body requires a cavity beneath the plug. Over time, the cavity fills with sediment, debris or sludge. The buildup of sediment, debris or sludge in the cavity will eventually preclude smooth operation of the valve and may lead to failure of the valve.

SUMMARY

The present invention provides a self-flushing valve having a valve body with a valve body inlet opening and a valve body outlet opening. The valve body carries a lower cap secured to the bottom of the valve body. The lower cap has an interior surface. The valve body also carries an upper cap secured to the top of the valve body. The upper cap having an opening or bore suitable for receiving a plug stem. The upper cap, lower cap and valve body define a cavity. Positioned within the cavity is a rotatable plug. The rotatable plug has a top stem passing through the opening within the upper cap. Additionally, the plug has a first opening or inlet and a second opening or outlet. The first and second openings define a central passageway. Alignment of the central passageway of the plug with the valve body inlet and valve body outlet provides a first continuous fluid path through the valve. In the open position, a gap exists between the lowest portion of the plug central passage and the valve body. The plug also carries a first upwardly projecting lip positioned at the lowest portion of the first opening or inlet. The plug carries a second upwardly projecting lip positioned at the lowest portion of the second opening or outlet. Upon alignment of the plug first and second openings with the valve body inlet opening and valve body outlet opening, the first and second upwardly projecting lips provide fluid communication with a second continuous fluid path defined by the bottom portion of the plug, the interior surface of the lower cap and the openings provided by the first and second upwardly projecting lips.

In another embodiment, the present invention provides a self-flushing valve having a valve body. The valve body defines an inlet opening, an outlet opening and a bottom. Secured to the top of the valve body is an upper cap. The upper cap has a central opening. The upper cap and valve body define a cavity. Positioned with the valve body cavity is a plug. The plug has a top stem passing through the opening in the upper cap. The plug has a first opening and a second opening defining a central passageway. When aligned with the valve body inlet opening and valve body outlet opening the central passageway provides a first continuous fluid path through the valve. In the open position, a gap exists between the lowest portion of the plug central passage and the valve body. The plug first opening carries a first upwardly projecting lip positioned at the lowest portion of the central passageway. Additionally, the plug second opening carries a second upwardly projecting lip positioned at the lowest portion of the central passageway. Upon alignment of the plug first and second openings with the valve body inlet opening and valve body outlet opening, the first and second upwardly projecting lips provide fluid communication with a second continuous fluid path defined by the bottom portion of the plug, the interior surface of the lower cap and the openings provided by the first and second upwardly projecting lips.

BRIEF DESCRIPTION OF THE DRAWINGS

FIG. 1 depicts a side cut away view of a prior art valve.

FIG. 8 depicts an embodiment of the present invention wherein the fluid diverting lip has been omitted from the plug.

FIG. 8A depicts an enlarged detail view of the gap defining the outlet for the second continuous flow path.

FIG. 8B depicts an enlarged detail view of the gap defining the inlet for the second continuous flow path.

FIG. 8C depicts an enlarged detail view of the top of the outlet gap.

FIG. 9 provides a comparison of a prior art plug, FIG. 9A, to embodiments of FIGS. 9B and 9C of the improved valve disclosed herein.

FIG. 18 depicts fluid pressure taken 1.875 seconds after initiation fluid flow within a valve utilizing the plug depicted in FIG. 9C, i.e. a plug having fluid diverting lips, with flow from right to left through the valve at a rate of 2 m/s.

FIG. 19 depicts fluid velocity taken 1.875 seconds after initiation fluid flow through a valve utilizing the plug depicted in FIG. 9C with flow from right to left through the valve at a rate of 2 m/s.

FIGS. 20 and 20A depict fluid vector analysis taken 1.875 seconds after initiation fluid flow through a valve utilizing the plug depicted in FIG. 9C.

FIG. 21 depicts the level of sediment remaining after evaluating the plug depicted in FIG. 9C after 1.875 seconds of fluid flow.

FIGS. 22A-22C provide a comparison of the sediment flushing capabilities of the plugs depicted in FIGS. 9A, 9B and 9C taken after 5 seconds of fluid flow at a rate of 2 m/s.

DETAILED DESCRIPTION

Figure 2:
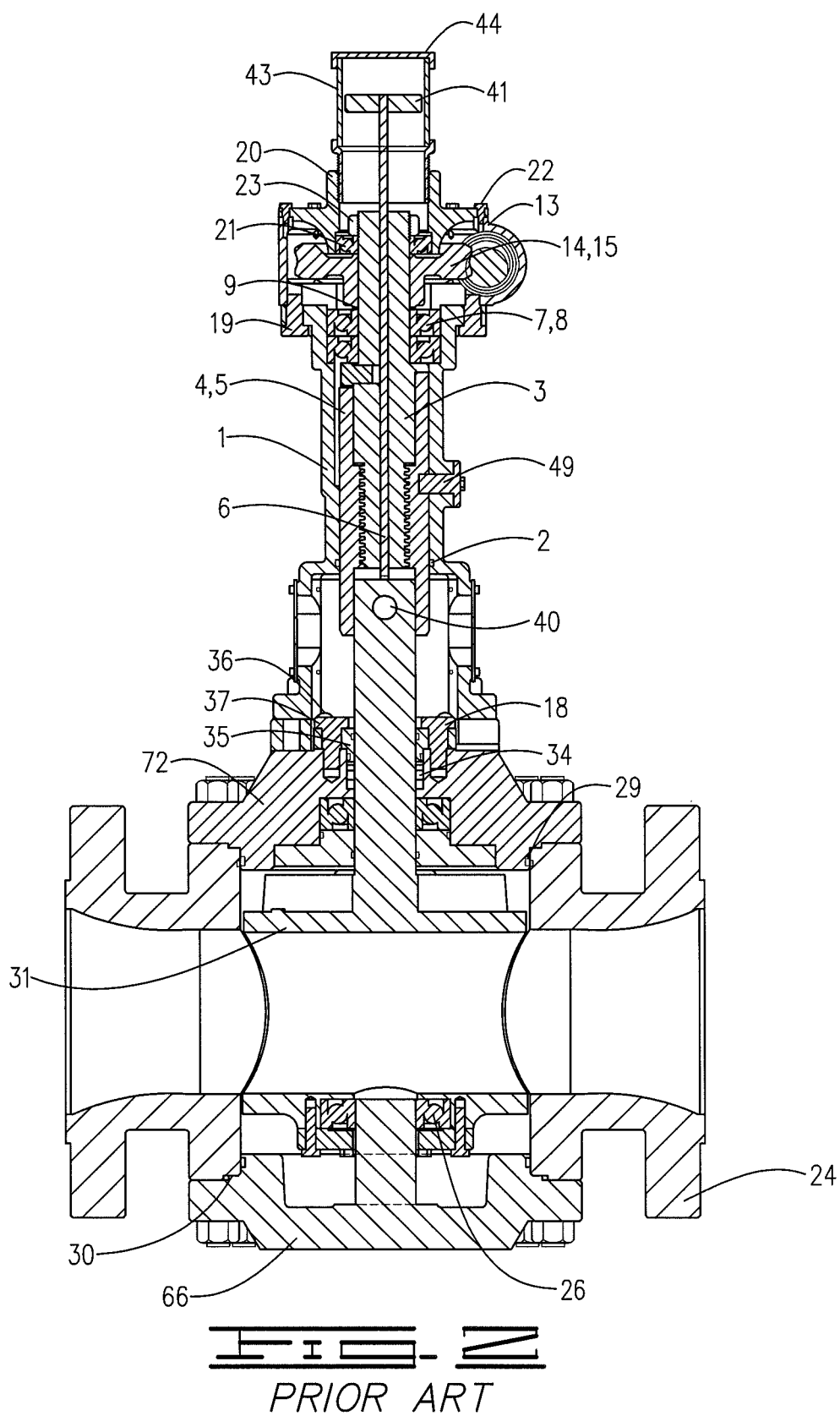
FIG. 2 depicts a side cut away view of a prior art valve showing the configuration of a conventional plug arrange to permit fluid flow through the valve.
Figure 3:
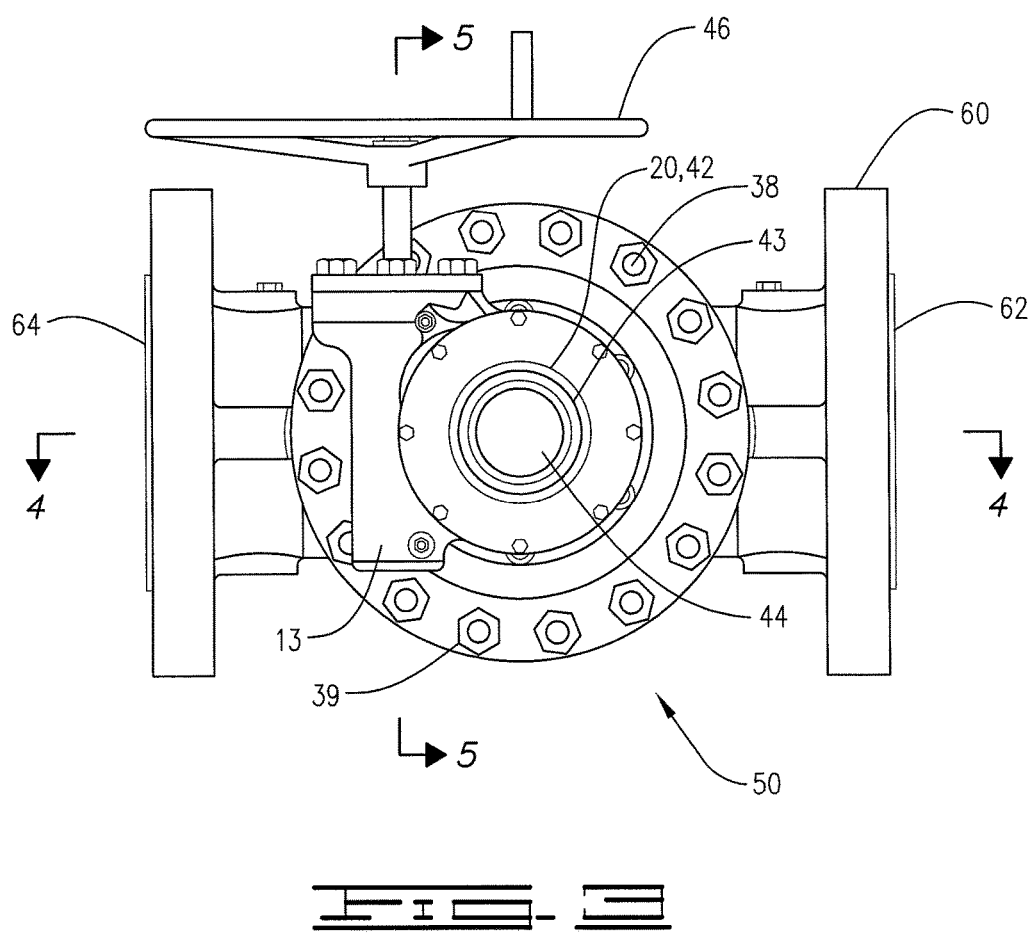
FIG. 3 is a top view of a valve incorporating the improvements disclosed herein.
Figure 4:
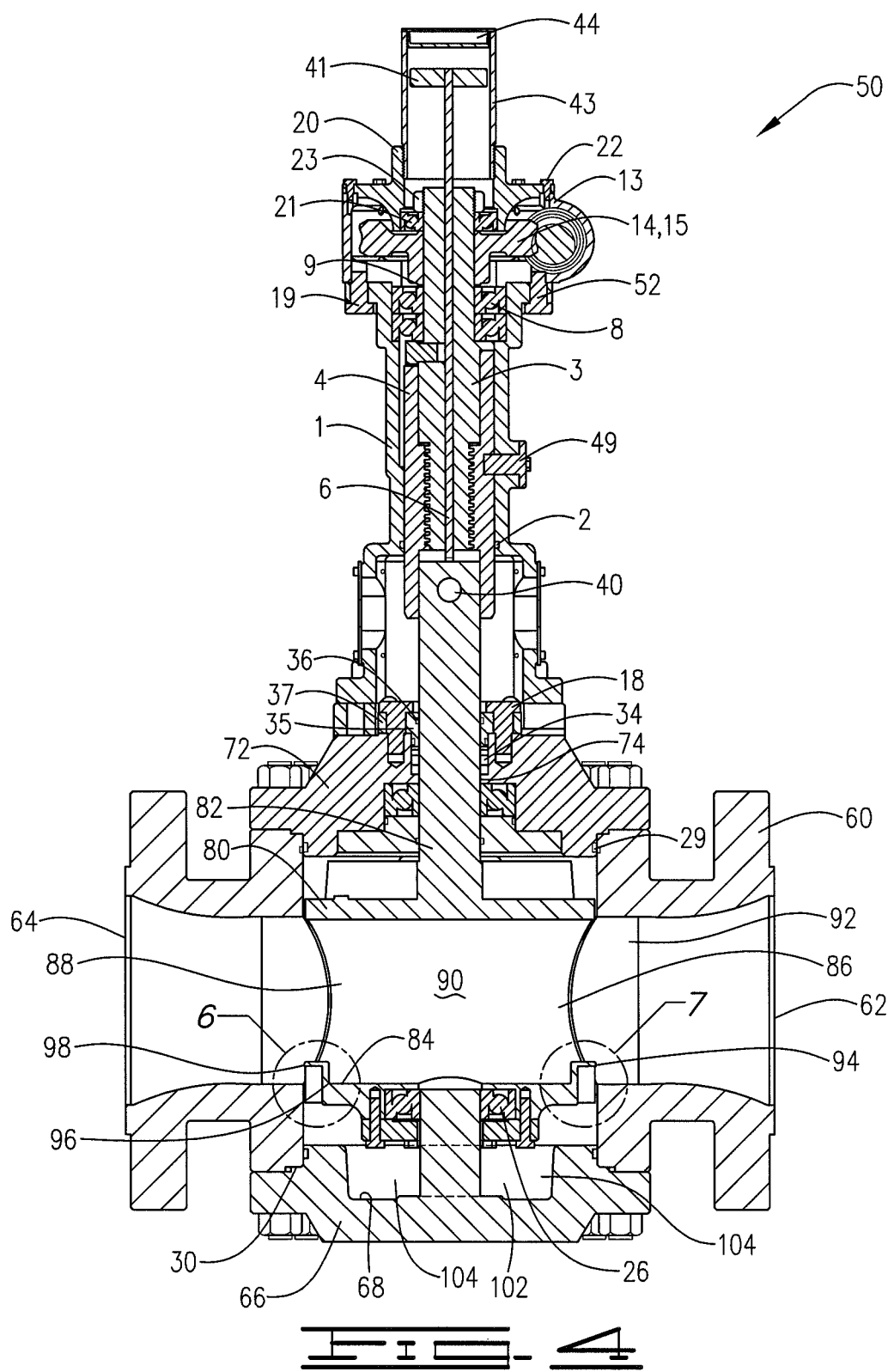
FIG. 4 is a side cut away view of the valve depicted in FIG. 3 taken along lines 4-4.
Figure 5:
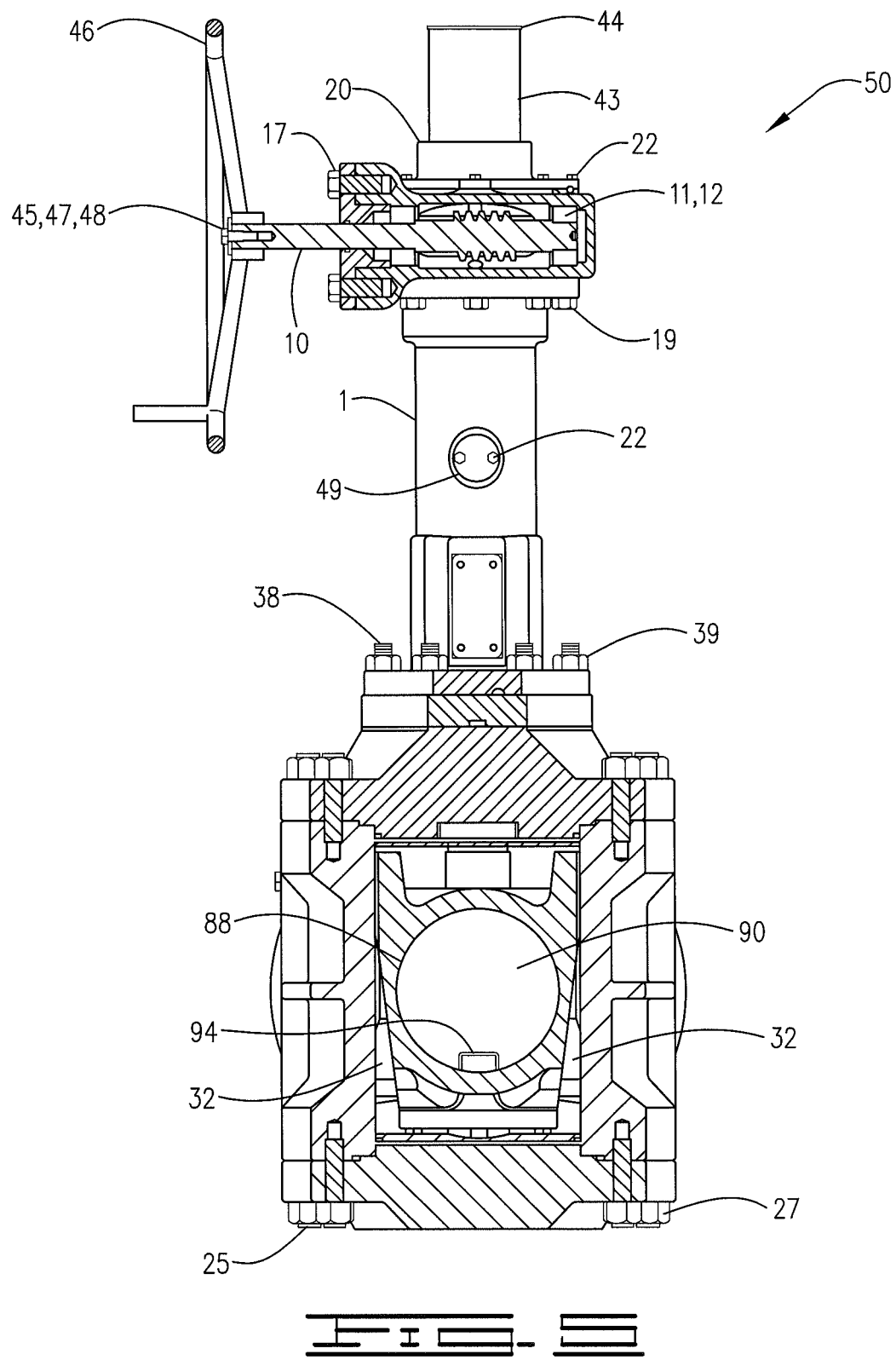
FIG. 5 is a side cut away view of the valve depicted in FIG. 3 taken along lines 5-5.

This disclosure provides an improved self-flushing double block and bleed valve 50. Referred to herein as DBB valve 50 or valve 50. With reference to FIGS. 4 and 5, DBB valve 50 includes conventional components such as a hand wheel 46, worm shaft 10 and upper stem 03. Table 1 below identifies the primary components of DBB valve 50 as depicted by FIGS. 4-8. Since the configuration, components and operation of a double block and bleed valve such as that depicted in FIGS. 1-2 (prior art) are well known, the following discussion will focus on those components that provide the self-flushing characteristics to the improved DBB valve 50.

TABLE 1

| Element Name | Element No. |
| --- | --- |
| Operator housing | 1 |
| O-ring | 2 |
| Upper stem | 3 |
| lower stem roller | 4 |
| indicator shaft assembly | 6 |
| circlip/angle adjust ball bearing | 8 |
| circlip | 9 |
| worm shaft | 10 |
| taper roller bearing | 11 |
| taper roller bearing | 12 |
| gear assembly | 13 |
| Key/worm gear | 14 |
| key/worm gear | 15 |
| bearing cap | 17 |
| hex screw | 18 |

TABLE 1-continued

| Element Name | Element No. |
| --- | --- |
| screw | 19 |
| protector adaptor | 20 |
| ball bearing | 21 |
| hex screw | 22 |
| hex nut | 23 |
| body | 24 |
| stud | 25A |
| stud | 25 |
| bearing | 26 |
| hex nut | 27 |
| cap-upper | 28 |
| O-ring | 29 |
| gasket | 30 |
| plug (FIG. 1) | 31 |
| slip | 32 |
| cap-lower | 33 |
| seal packing | 34 |
| o-ring | 35 |
| o-ring | 36 |
| gland packing | 37 |
| stud | 38 |
| hex nut | 39 |
| pin | 40 |
| flag | 41 |
| protector tube | 43 |
| protector cap | 44 |
| half moon key | 45 |
| hand wheel | 46 |
| washer | 47 |
| hex bolt | 48 |
| guide pin | 49 |
| Valve | 50 |
| Valve body | 60 |
| Valve body inlet opening | 62 |
| Valve body outlet opening | 64 |
| Lower cap | 66 |
| Interior surface of the lower cap | 68 |
| Upper cap | 72 |
| Central opening in upper cap | 74 |
| Rotatable plug (FIGS. 4-9) | 80 |
| Top stem | 82 |
| Bottom portion of the rotatable plug | 84 |
| First opening or inlet of plug | 86 |
| Second opening or outlet of plug | 88 |
| Central passage through plug | 90 |
| Continuous flow path through valve body and plug | 92 |
| First upwardly projecting lip | 94 |
| Lowest portion of central passage of plug | 96 |
| Second upwardly projecting lip | 98 |
| Second continuous flow path | 102 |
| Cavities | 104 |
| Gap | 106 |

As depicted in FIGS. 4 and 5, DBB valve 50 includes a valve body 60. Valve body 60 defines or carries an inlet opening 62 and defines or carries an outlet opening 64. Valve body 60 carries lower cap 66 secured to the bottom of valve body 60 and upper cap 72 secured to the top of valve body 60. The alignment of a rotatable plug 80 determines the functionality, i.e. open or closed, of DBB valve 50. Rotatable plug 80 has a top stem 82 passing through a central opening 74 of upper cap 72. Top stem 82 is pinned to or otherwise secured to upper stem 3. Thus, as known to those skilled in the art, rotation of hand wheel 46 controls movement of rotatable plug 80. Rotatable plug 80 further has a first opening 86 and a second opening 88. Openings 86 and 88 define a central passage 90 through rotatable plug 80.

Hand wheel 46 controls movement and alignment of plug 80. Alignment of central passage 90 with inlet opening 62 and an outlet opening 64 provides a first continuous fluid path 92 through DBB valve 50. Rotation of hand wheel 46 will transition plug 80 through ninety degrees of movement and move plug 80 downward thereby blocking fluid flow through plug 80. Upon seating of plug 80 at the lowest point, further rotation of hand wheel 46 will extend the slips (not shown) thereby sealing valve inlet 62 and outlet 64. With plug 80 turned to block fluid flow through DBB valve 50, a singular annular cavity 104 exists below plug 80 in lower cap 33.

Cavity 104 frequently collects sediment, debris and sludge. Over time, cavity 104 will fill sufficiently to preclude efficient operation of DBB valve 50. Disassembly and reassembly of DBB valve 50 to clean cavity 104 requires halting operations of the line served by DBB valve 50.

To alleviate the deposition of material in cavity 104, plug 80 has been modified to provide for continuous flushing of cavity 104 during operation of valve 50. See FIG. 9C. In one embodiment depicted in FIGS. 8-8c, openings or gaps 106 between plug 80 and valve body 50 have been provided. Gaps 106 at each end of continuous flow path 102 are depicted in FIGS. 8a and 8b. FIG. 8c depicts a top view of the gap depicted in FIG. 8a; however, the top view of FIG. 8b would appear identical to that of FIG. 8a. Gaps 106 allow a portion of the fluid flowing through central passage 90 to enter into cavity 104 during operation of valve 50. As shown in FIG. 5, gaps 106 permit the continuous flow of fluid through a second continuous flow path 102 beneath plug 80. During fluid flow through valve 50, the continuous flow of fluid through second continuous flow path 102 carries debris out of cavity 104 and transports the debris out of valve 50 through valve outlet 64.

FIG. 4 depicts a further improvement to plug 80. To improve fluid flow through second continuous flow path 102, first opening 86 of plug 80 may further carry a first upwardly projecting lip 94 associated with gap 106 at the lowest portion 96 of central passage 90, i.e. at bottom portion 84 of plug 80 adjacent to inlet 86. Additionally, second opening 88 of plug 80 carries a second upwardly projecting lip 98 associated with gap 106 at the lowest portion 96 of central passage 90, i.e. at bottom portion 84 of plug 80 adjacent to outlet 88. Upwardly projecting lips 94, 98 may be in the form of a flange or protrusion or other extension from the lowest portion 96 of central passage 90. Thus, gaps 106 and projecting lips 94, 98 cooperate to provide second continuous fluid path 102 when plug 80 is in alignment with valve body 60 to provide fluid flow through central passageway 90. In general, lips 94 and 98 will extend above lower portion 96 of central passageway 90 by about 0.15 inch to about 3.0 inch. More preferably, lips 94 and 98 will extend above lower portion 96 of central passageway 90 by about 0.24 inch to about 2.5 inch. The distance lips 94 and 98 extend above lower portion 96 will vary with valve size. Typically, lips 94 and 98 extend into path 92 a distance sufficient to divert approximately 2% to about 5% of the fluid passing through path 92 into and through fluid path 102.

Figure 6:
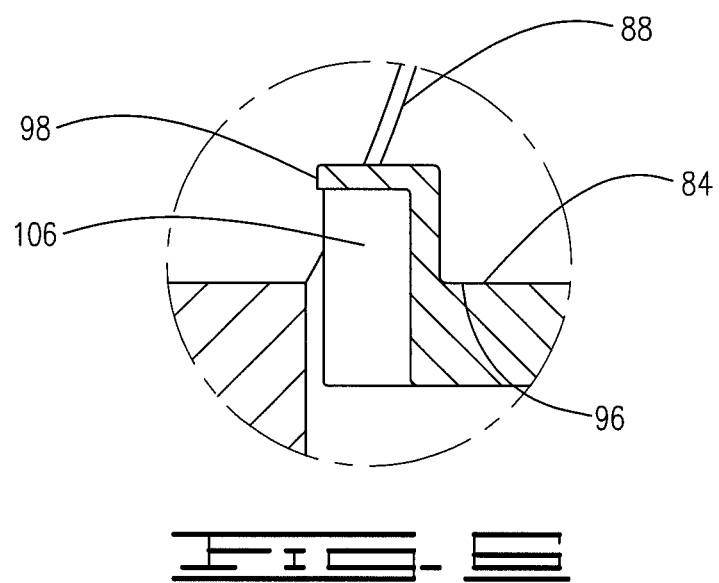
FIG. 6 is a detail view of Detail Area 7 identified in FIG. 4.
Figure 7:
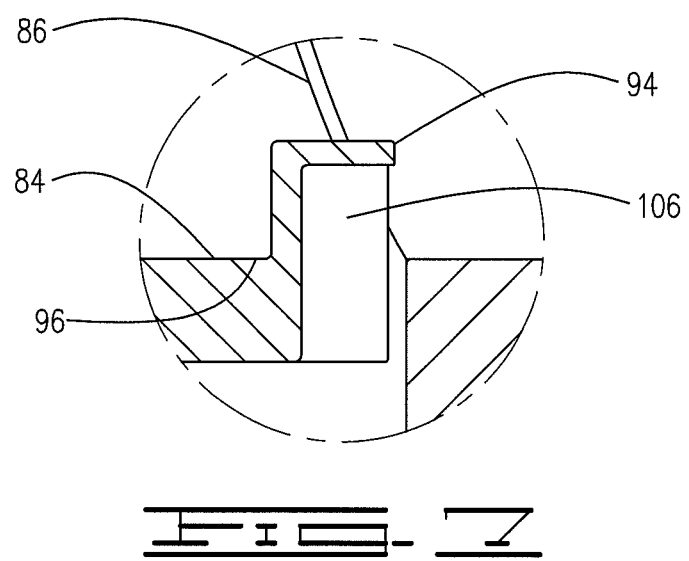
FIG. 7 is a detail view of Detail Area 8 identified in FIG. 5.

As depicted in FIG. 6, gap 106 is defined by valve body 60 and a recess in the lowest portion 96 of central passage of plug 80. The cooperation of gaps 106 in conjunction with lips 94, 98 must provide for sufficient fluid flow through second continuous fluid path 102 to clear cavity 104 of debris, sediment or sludge. Thus, lips 94 and 98 cooperate with gaps 106 to ensure adequate fluid flow along second continuous fluid path 102 and through cavity 104 to dislodge and remove debris, sediment or sludge. For purposes of this discussion, fluid flow passes through valve 50 from right to left. Under these conditions, lip 94 acts as the entrance lip and lip 98 the exit lip. Lip 94 captures a sufficient amount of fluid to create the second continuous fluid path 102 through cavity 104. Lip 98, acting as the exit lip, aid in mixing of the second continuous fluid path 102 back into first fluid path 92 thereby carrying debris, sediment or sludge out of cavity 104 into first fluid path 92. Although described herein with regard to flow from right to left, valve 50 will also provide the desired self-cleaning function under conditions of fluid flow from left to right. Under left to right flow conditions, lip 98 acts as the inlet lip and lip 94 as the exit lip.

In general, gaps 106 will have a depth of about 0.19 inch to about 3 inches (dimension X) from the edge of plug 80 and a width of about 0.5 inches to about 5 inches (dimension Y) depending on the size of the valve. Thus, larger valves will have larger dimensions for gap 106 to ensure adequate flow through path 102 to maintain cavity 104 substantially free of sediment.

Typically, each lip 94 and 98 will define a canopy or scoop, i.e. an upwardly and forwardly projecting curved flange having a back-wall and sidewalls that connect to the lowest portion 96 of plug 80 and at least overlap or extend above gap 106. As depicted in FIG. 5, lip 94 will direct a consistent volume of fluid into second continuous flow path 102 and optional lip 98 in cooperation with gap 106 defines the exit port for fluid exiting second continuous path 102.

FIGS. 10-22 demonstrate the improvement provided by the embodiments of the present invention over the prior art. FIG. 9A depicts a prior art plug. FIG. 9B depicts a plug 80 with gaps 106. FIG. 9C depicts plug 80 with lips 94 and 98 adjacent to gaps 106. The dashed line in FIG. 10 represents the level of sediment prior to each flushing test.

Figure 10:
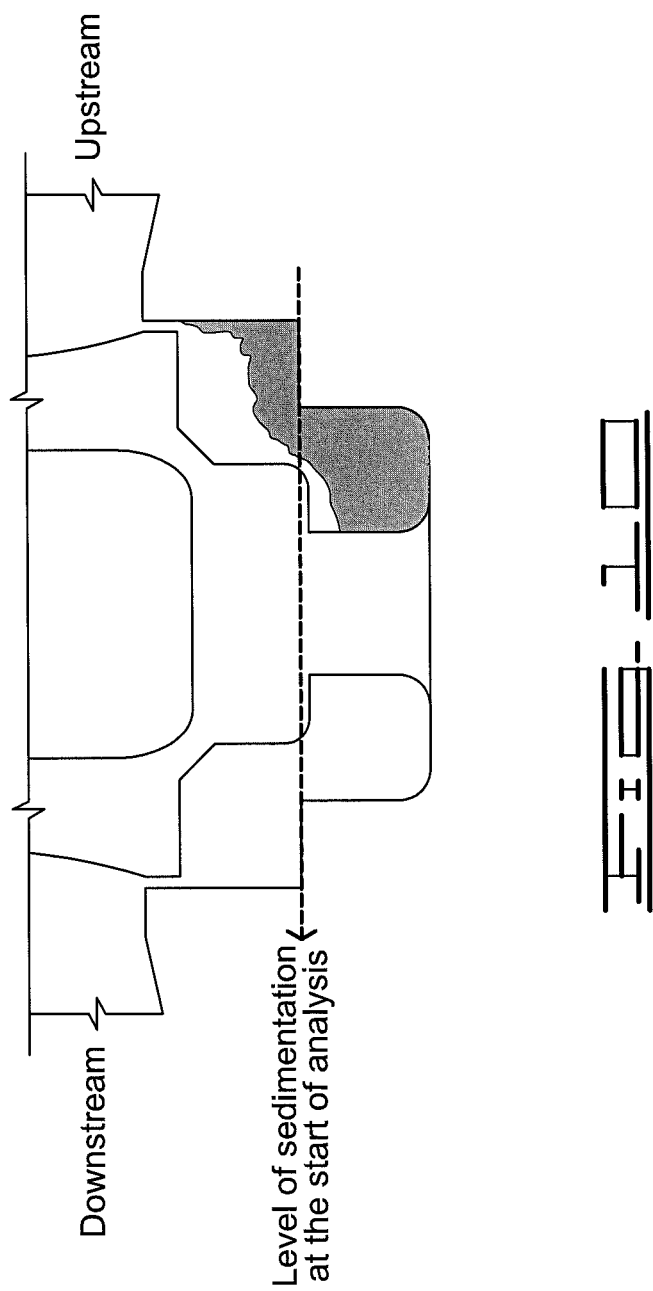
FIG. 10 depicts the level of sediment following the analysis of the plug depicted in FIG. 9A with the dashed line representing pre-test sediment level.
Figure 11:
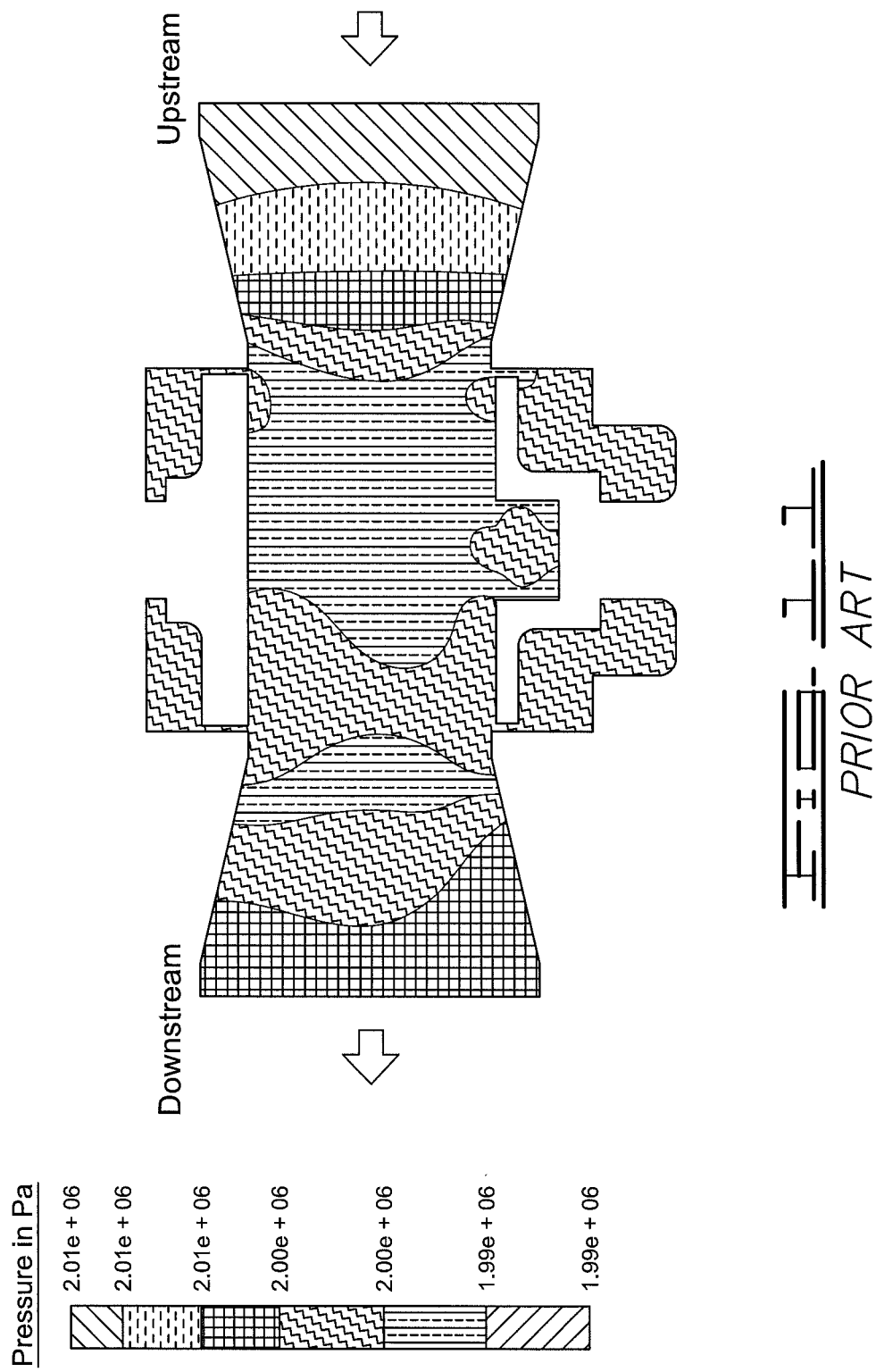
FIG. 11 depicts fluid pressure within a valve utilizing the plug depicted in FIG. 9A with flow from right to left through the valve at a rate of 2 m/s.
Figure 12:
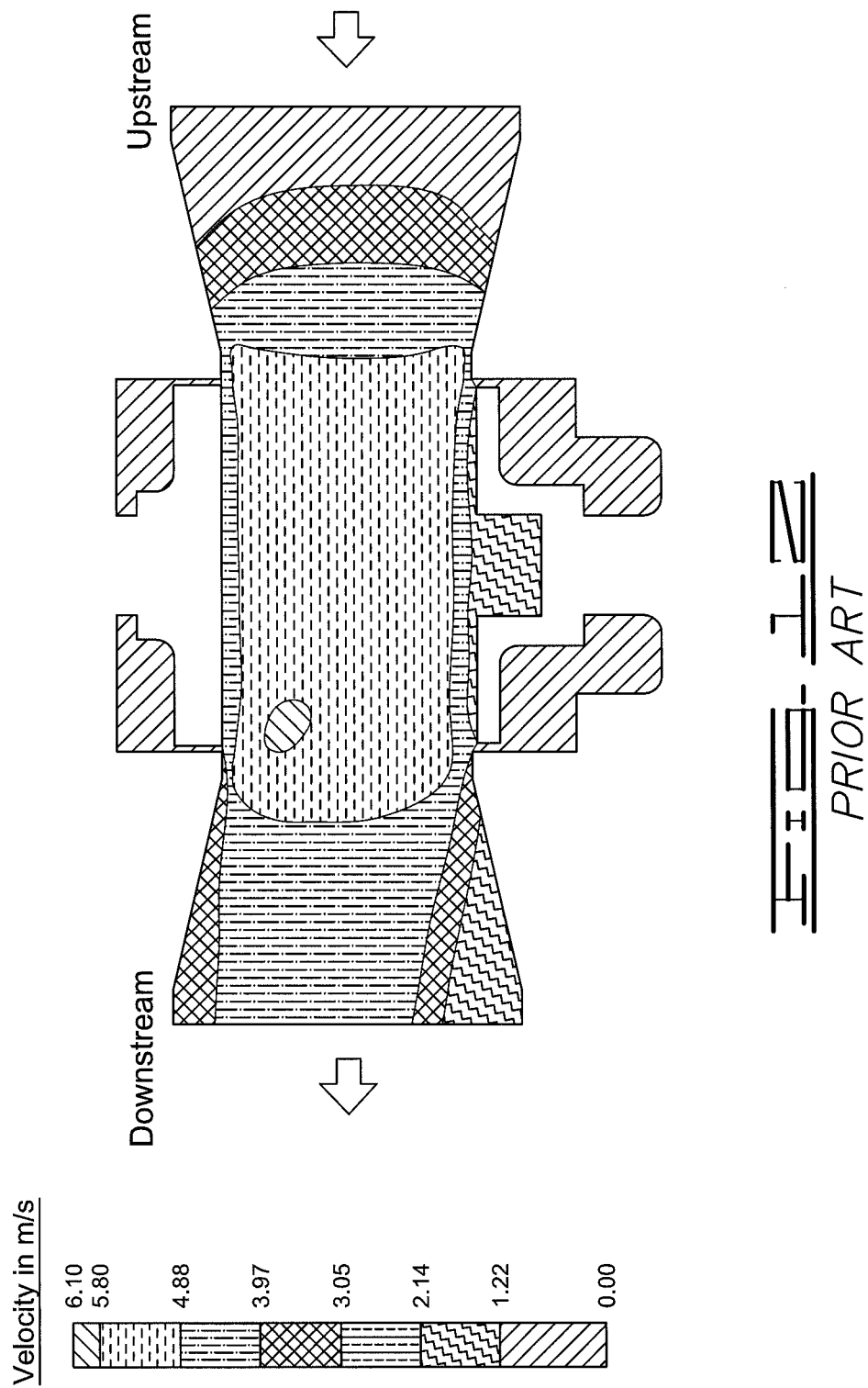
FIG. 12 depicts fluid velocity through a valve utilizing the plug depicted in FIG. 9A with flow from right to left through the valve at a rate of 2 m/s.
Figure 13:
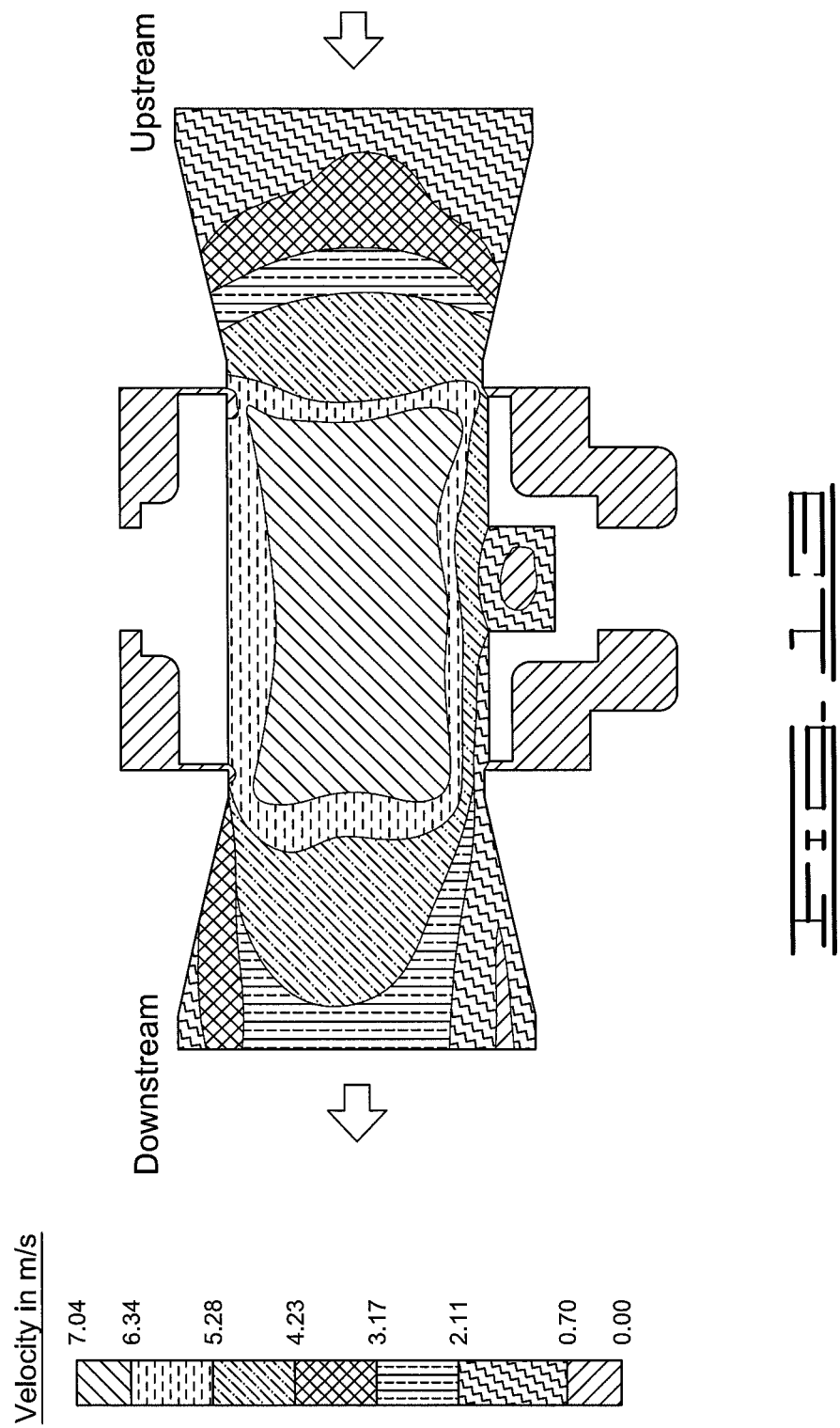
FIG. 13 depicts velocity vectors at 5 s analysis time, i.e. 5 seconds after initiation of fluid flow, in a valve utilizing the plug depicted in FIG. 9A.
Figure 14:
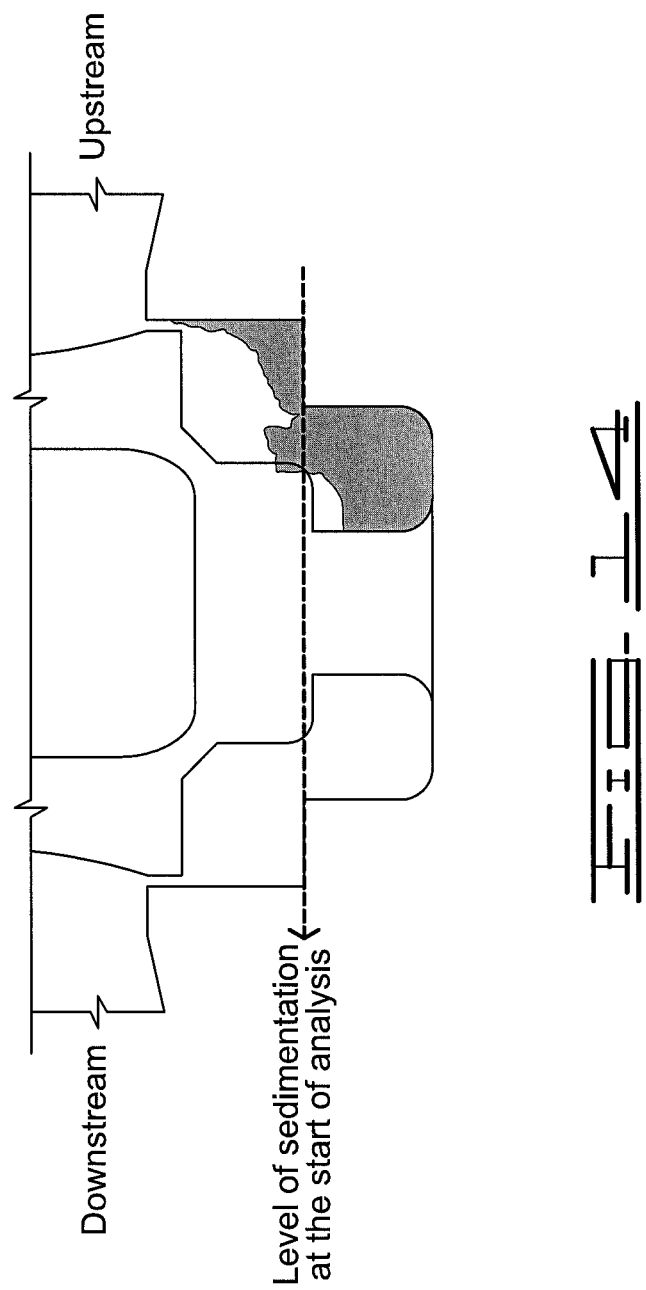
FIG. 14 depicts the level of sediment remaining after evaluating the plug depicted in FIG. 9B.

Each plug depicted in FIGS. 9A-9C was tested to determine its ability to clear sediment at a level as depicted in FIG. 10. Testing of each plug was carried out by placing the indicated level of sediment in cavity 104 and flowing diesel (density of about 0.812 kg/m$^3$) through the open valve at a flow velocity of 2 m/s and a pressure of 290 psi as measured at the entrance of the valve. Downstream pressures and velocities were determined using computational fluid dynamics as depicted in FIGS. 11-21. Additionally, fluid velocity, as determined by computational fluid dynamics, through continuous path 102 was measured and depicted. Thus, in addition to testing the ability to clear sediment, pressure and the resulting flow rate testing data provides an understanding of the ability of each plug to clear sediment from cavity 104.

As demonstrated by FIGS. 11-14, under normal operational conditions, the prior art plug precludes fluid access to cavity 104. In particular, FIGS. 11 and 12 reflect very low pressure and an indicated zero velocity value along path 102. Additionally, the vector velocity values depicted in FIG. 13 demonstrates the lack of flow through cavity 104 within the prior art valve. Thus, build-up of debris in cavity 104 will continue during operation, i.e. opening and closing, of the prior art valve using the plug of FIG. 9A.

Figure 15:
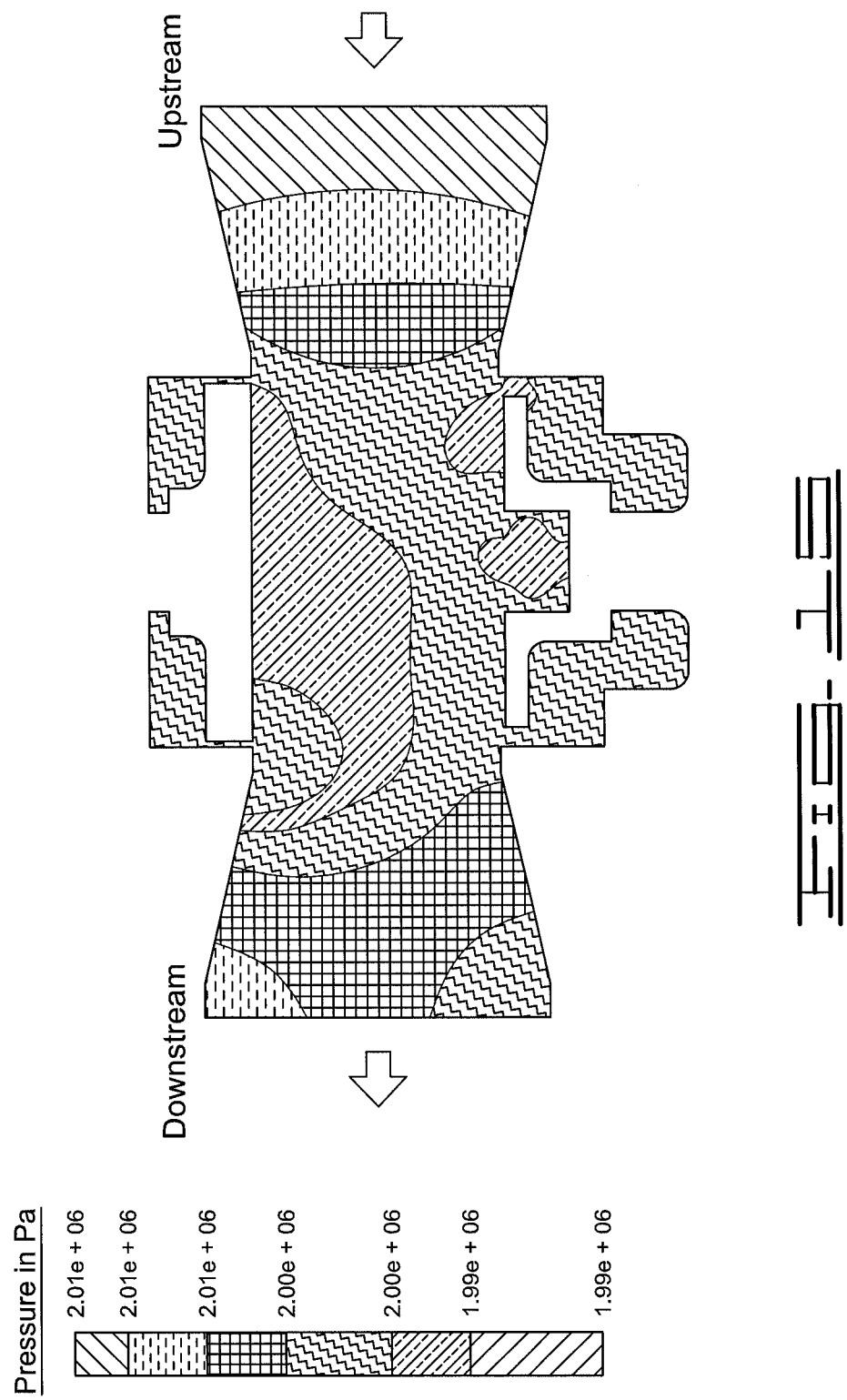
FIG. 15 depicts fluid pressure within a valve using the plug depicted in FIG. 9B, i.e. lacking fluid diverting lips, with flow from right to left through the valve at a rate of 2 m/s.
Figure 16:
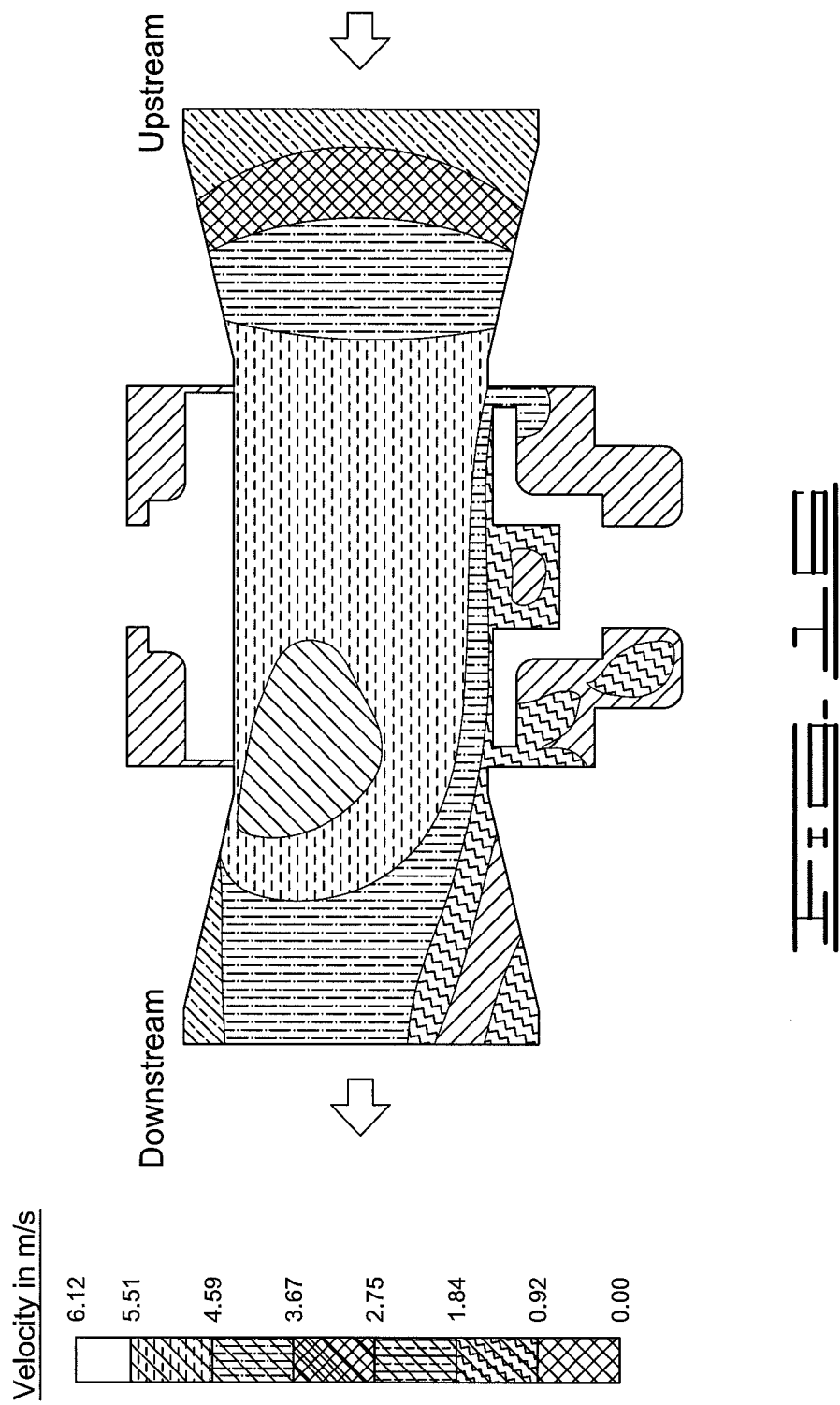
FIG. 16 depicts fluid velocity through a valve using the plug depicted in FIG. 9B with flow from right to left through the valve at a rate of 2 m/s.
Figure 17:
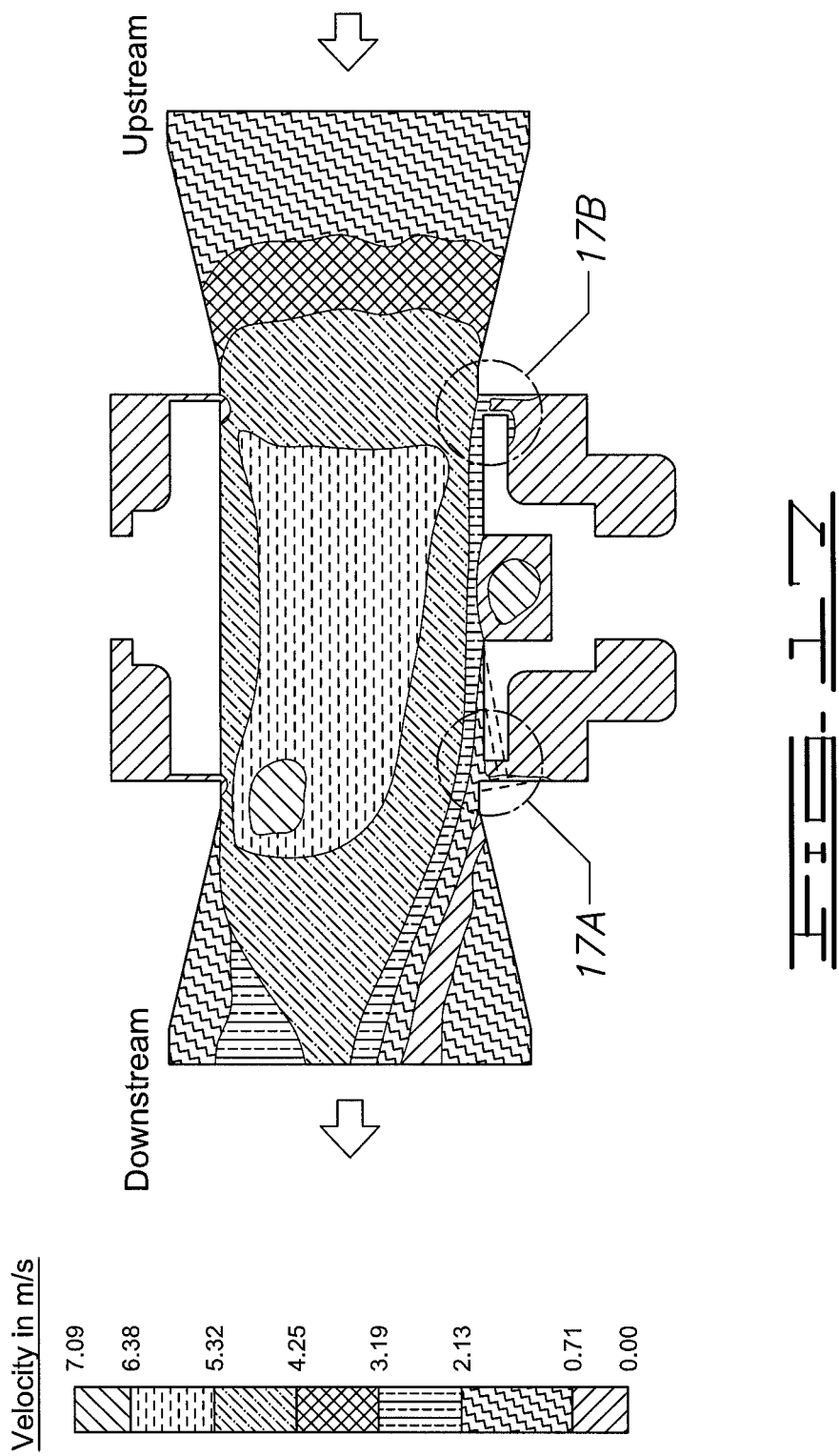
FIGS. 17, 17A and 17B depicts velocity vectors at 5 s analysis time, i.e. 5 seconds after initiation of fluid flow, in a valve utilizing the plug depicted in FIG. 9B.
Figure 17A:
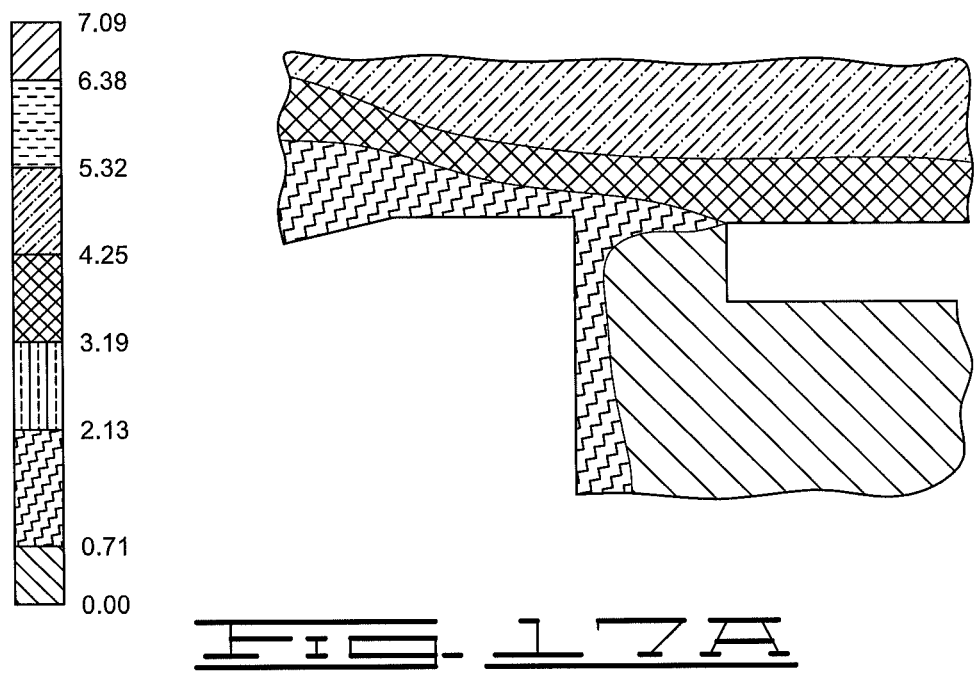
Figure 17B:
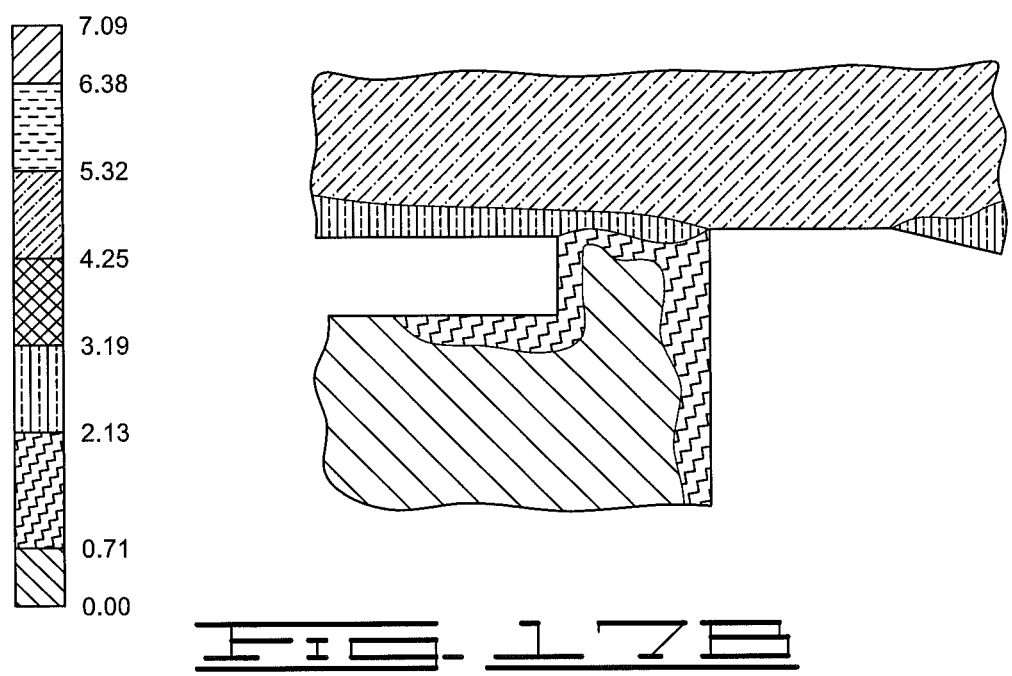

Similarly, as indicated in FIGS. 15 and 16, under the operational conditions, merely removing a section of central passage from plug 80 to provide an opening or gap 106 did not significantly increase fluid flow through cavity 104. As depicted in FIG. 15, cavity 104 experienced very little increase in fluid pressure during operation of valve 50. Further, FIG. 16 demonstrates that fluid flow through the valve body of FIG. 9B did not experience significant increase fluid velocity along flow path 102. The results of FIG. 16 correspond to the vector analysis results depicted in FIGS. 17, 17A and 17B. As reflected in FIGS. 17-17B, fluid flow does not reach the valve base and does not adequately flow through cavity 104. Thus, the described operating conditions removed very little debris from cavity 104 when the valve operated with the plug depicted in FIG. 9B.

As reflected by FIGS. 18-21, the embodiment of FIG. 9C provided the best results. Embodiment 9C includes the further modification of upwardly projecting lips 94, 98 in combination with gap 106. Lip 94, associated within the inlet side of plug 80, is configured as a scoop. Thus, lip 94 effectively captures and provides continuous flow of fluid through path 102.

As reflected in FIG. 18, second continuous flow path 102 experienced the greatest increase in fluid pressure when using the embodiment of FIG. 9C. Additionally, flow path 102 experienced the greatest increase in flow rate. Further, FIG. 18 demonstrates the increased fluid velocity along path 102 through cavity 104. Finally, FIGS. 20 and 20A depict the improved vector velocities of fluid passing along path 102 through cavity 104. Thus, the fluid stream provided by lips 94 and 98 will better entrain and remove sediment from cavity 104. As depicted in FIG. 21, substantially all sediment was removed from cavity 104 when valve 50 was operated using plug 80 of FIG. 9C.

FIGS. 22A, 22B and 22C provide a side-by-side comparison of the capabilities of plugs 80 depicted in FIGS. 9A, 9B and 9C respectively. As shown in FIG. 22, prior art plug 80 depicted in FIG. 9A failed to clear any sediment from cavity 104. Modified plug 80 of FIG. 9B removed a small portion of sediment but failed to provide adequate clearing. Finally, plug 80 of FIG. 9C modified with gap 106 and upwardly projecting lip 94 cleared substantially all sediment from cavity 104.

Other embodiments of the present invention will be apparent to one skilled in the art. As such, the foregoing description merely enables and describes the general uses and methods of the present invention. Accordingly, the following claims define the true scope of the present invention.

We claim:

1. A valve comprising:
a valve body, said valve body defining an inlet opening, an outlet opening and a bottom;
a lower cap secured to the bottom of said valve body said lower cap having an interior surface;
an upper cap secured to a top of said valve body, said upper cap having a central opening;
said upper cap, lower cap and valve body define a first cavity,
a rotatable plug positioned within said first cavity, said rotatable plug having a top stem passing through said opening in said upper cap and said rotatable plug having a bottom portion;
said rotatable plug having a first opening and a second opening defining a central passageway, said central passageway when aligned with said valve body inlet opening and valve body outlet opening provides a first continuous fluid path through said valve;
said rotatable plug first opening having a first gap at the lowest portion of said first opening;
said rotatable plug first opening carrying a first upwardly projecting lip adjacent to said first gap;
said rotatable plug second opening having a second gap at the lowest portion of said central passageway;
when said rotatable plug first and second openings are aligned with said valve body inlet opening and valve body outlet opening, said first and second gaps provide fluid communication with a second continuous fluid path, said second continuous fluid path defined by the bottom portion of said rotatable plug and the interior surface of said lower cap.

2. The valve of claim 1, wherein said first upwardly projecting lip is in the form of a scoop.

3. The valve of claim 1, wherein said first upwardly projecting lip extends from about 0.15 inch to about 3.0 inch above the lowest portion of said first opening.

4. The valve of claim 1, wherein said first upwardly projecting lip extends from about 0.25 inch to about 2.5 inch above the lowest portion of said first opening.

5. The valve of claim 1, wherein said first upwardly projecting lip extends a sufficient distance into said first fluid path to divert about 2% to about 5% of the fluid passing through said first fluid path through said second fluid path.

6. The valve of claim 1, wherein said first and second gaps will have a depth of about 0.19 inch to about 3 inches and a width of about 0.5 inches to about 5 inches.

7. The valve of claim 1, wherein when said rotatable plug is in the closed position, said rotatable plug and said lower cap define a second cavity and wherein when said rotatable plug is in an open position said second continuous fluid path passes through a region of said second cavity.

8. The valve of claim 1, wherein said first and second gaps will have a depth of about 0.19 inch to about 3 inches and a width of about 0.5 inches to about 5 inches.

9. The valve of claim 1, wherein when said rotatable plug is in the closed position, said rotatable plug and said lower cap define a second cavity and wherein when said rotatable plug is in an open position said second continuous fluid path passes through a region of said second cavity.

10. A valve comprising:
a valve body, said valve body defining an inlet opening, an outlet opening and a bottom;
an upper cap secured to the top of said valve body, said upper cap having a central opening;
said upper cap and valve body define a first cavity,
a plug positioned within said first cavity, said plug having a top stem passing through said central opening in said upper cap;
said plug having a first opening and a second opening defining a central passageway, said central passageway when aligned with said valve body inlet opening and valve body outlet opening provides a first continuous fluid path through said valve;
said plug first opening having a first gap at the lowest portion of said central passageway, said gap having a depth of about 0.19 inch to about three inches and a width of about 0.5 inch to about 5 inches;
said plug first opening carrying a first upwardly projecting lip, said first upwardly projecting lip carried at a lowest portion of said central passageway adjacent to said first gap;
said plug second opening having a second gap at the lowest portion of said central passageway, said gap having a depth of about 0.19 inch to about three inches and a width of about 0.5 inch to about 5 inches;

said plug second opening carrying a second upwardly projecting lip, said second upwardly projecting lip carried at the lowest portion of said central passageway;

when said plug first and second openings are aligned with said valve body inlet opening and valve body outlet opening, said first and second gaps provide fluid communication with a second continuous fluid path, said second continuous fluid path defined by the bottom portion of said plug and the interior surface of said lower cap.

11. The valve of claim 10, wherein said first upwardly projecting lip extends from about 0.15 inch to about 3.0 inch above the lowest portion of said first opening.

12. The valve of claim 11, wherein said first and second upwardly projecting lips extend from about 0.15 inch to about 3.0 inch into said continuous fluid path.

13. The valve of claim 11, wherein said first upwardly projecting lip extends from about 0.25 inch to about 2.5 inch above the lowest portion of said first opening.

14. The valve of claim 11, wherein said first upwardly projecting lip extends a sufficient distance into said first fluid path to divert about 2% to about 5% of a fluid passing through said first fluid path.

15. The valve of claim 11, wherein said first and second gaps will have a depth of about 0.19 inch to about 3 inches and a width of about 0.5 inches to about 5 inches.

16. The valve of claim 11, wherein said first and second upwardly projecting lips are in the form of a scoop.

17. The valve of claim 10, wherein said first upwardly projecting lip extends from about 0.25 inch to about 2.5 inch above the lowest portion of said first opening.

18. The valve of claim 10, wherein said first upwardly projecting lip extends a sufficient distance into said first fluid path to divert about 2% to about 5% of the fluid passing through said first fluid path through said second fluid path.

19. The valve of claim 10, wherein when said plug is in the closed position, said rotatable plug and said lower cap define a second cavity and wherein when said plug is in an open position said second continuous fluid path passes through the region of said second cavity.

20. The valve of claim 10, wherein said first and second upwardly projecting lips are in the form of a scoop.

21. A plug configured for use in a double block and bleed valve, comprising:
a first opening and a second opening defining a central passageway through said plug, said central passageway provides a continuous fluid path through said valve;
said first opening having a first gap at the lowest portion of said first opening;
said first opening carrying a first upwardly projecting lip adjacent to said first gap;
said second opening having a second gap at the lowest portion of said central passageway;
said second opening carrying a second upwardly projecting lip adjacent to said second gap.

22. A valve comprising:
a valve body, said valve body defining an inlet opening, an outlet opening and a bottom;
a lower cap secured to the bottom of said valve body said lower cap having an interior surface;
an upper cap secured to a top of said valve body, said upper cap having a central opening;
said upper cap, lower cap and valve body define a first cavity,
a plug positioned within said first cavity, said plug having a top stem passing through said central opening in said upper cap;
said plug having a first opening and a second opening defining a central passageway, said central passageway when aligned with said valve body inlet opening and valve body outlet opening provides a first continuous fluid path through said valve;
said plug first opening having a first gap at a lowest portion of said central passageway;
said plug first opening carrying a first upwardly projecting lip, said first upwardly projecting lip carried at the lowest portion of said central passageway adjacent to said first gap;
said plug second opening having a second gap at a lowest portion of said central passageway;
said plug second opening carrying a second upwardly projecting lip, said second upwardly projecting lip carried at the lowest portion of said central passageway;
when said plug first and second openings are aligned with said valve body inlet opening and valve body outlet opening, said first and second gaps provide fluid communication with a second continuous fluid path, said second continuous fluid path defined by the bottom portion of said plug and the interior surface of said lower cap.

23. The valve of claim 22, wherein said first upwardly projecting lip is in the form of a scoop.

24. The valve of claim 22, wherein said first upwardly projecting lip extends from about 0.15 inch to about 3.0 inch above the lowest portion of said first opening.

25. The valve of claim 22, wherein said first upwardly projecting lip extends from about 0.25 inch to about 2.5 inch above the lowest portion of said first opening.

26. The valve of claim 22, wherein said first upwardly projecting lip extends a sufficient distance into said first fluid path to divert about 2% to about 5% of the fluid passing through said first fluid path through said second fluid path.

* * * * *